US008327266B2

(12) United States Patent  
Svendsen

(10) Patent No.: US 8,327,266 B2  
(45) Date of Patent: Dec. 4, 2012

(54) GRAPHICAL USER INTERFACE SYSTEM FOR ALLOWING MANAGEMENT OF A MEDIA ITEM PLAYLIST BASED ON A PREFERENCE SCORING SYSTEM

(75) Inventor: Hugh Svendsen, Chapel Hill, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 1058 days.

(21) Appl. No.: 11/750,002

(22) Filed: May 17, 2007

(65) Prior Publication Data

US 2009/0055759 A1  Feb. 26, 2009

Related U.S. Application Data

(63) Continuation-in-part of application No. 11/484,130, filed on Jul. 11, 2006, now Pat. No. 7,680,959.

(51) Int. Cl.  
*G06F 3/00* (2006.01)

(52) U.S. Cl. .................. 715/716; 715/811; 707/848

(58) Field of Classification Search .................. 715/833, 715/716, 811; 709/231; 707/3, 104.1, 748  
See application file for complete search history.

(56) References Cited

U.S. PATENT DOCUMENTS

| | | | |
|---|---|---|---|
| 4,870,579 A | 9/1989 | Hey | |
| 5,621,456 A | 4/1997 | Florin et al. | |
| 5,724,567 A | 3/1998 | Rose et al. | |
| 5,771,778 A | 6/1998 | MacLean, IV | |
| 5,956,027 A | 9/1999 | Krishnamurthy | |
| 5,960,437 A | 9/1999 | Krawchuk et al. | |
| 5,963,916 A | 10/1999 | Kaplan | |
| 6,134,552 A | 10/2000 | Fritz et al. | |
| 6,195,657 B1 | 2/2001 | Rucker et al. | |
| 6,266,649 B1 | 7/2001 | Linden et al. | |

(Continued)

FOREIGN PATENT DOCUMENTS

CN  1208930 A  2/1999

(Continued)

OTHER PUBLICATIONS

"MyStrands for Windows 0.7.3 Beta" downloaded from Internet <http://www.shareapple.com/172-MyStrandsWindowsPAD.htm> on Jul. 18, 2007.

(Continued)

*Primary Examiner* — Phenuel Salomon  
(74) *Attorney, Agent, or Firm* — Withrow & Terranova, PLLC

(57) ABSTRACT

Graphical user interfaces (GUIs) for a peer device on a peer-to-peer (P2P) network are disclosed. A client application executing on the peer device provides and enables the GUIs. One of the GUIs may display a media item playlist. The user manages the media items displayed on the media item playlist by utilizing sorting criteria. The media item playlist displays a list of the users subscribing to the P2P network, the title of and information concerning media items recommended by the users and media items stored locally on the peer device, and a score for each media item on the media item playlist. The score may be determined by applying to the media items preferences defined by information provided by the user of the peer device, a profile developed from the defined preferences, and other information provided by the user. The user of the peer device provides the information to the peer device using other GUIs provided and enabled by the client application.

13 Claims, 14 Drawing Sheets

| user | song | artist | genre | decade | time | availability | score |
|---|---|---|---|---|---|---|---|
| hugh | sweet emotion | aerosmith | rock | 1970s | 45:32:21 | local | 95 |
| waymen | so what | miles davis | jazz | 1960s | 6:37 | find | 94 |
| gary | dance in my sleep | dave adams | alternative | 1980s | 4:25 | subscription network | 92 |
| waymen | come away with me | norah jones | jazz | 2000s | 4:56 | subscription network | 88 |
| mike | walk the line | johnny cash | country | 1970s | 5:31 | buy/download | 86 |
| hugh | say hey | the tubes | alternative | 1980s | 20:54:24 | local | 86 |
| hugh | you get what you give | new radicals | alternative | 1990s | 4:12:03 | local | 83 |
| hugh | tenderness | general public | new wave | 1980s | 25:32:21 | local | 83 |
| hugh | running with the devil | van halen | rock | 1970s | 12:35:11 | local | 82 |
| gene | rebel yell | billy idol | punk | 1980s | 0:32 | subscription network | 81 |
| gene | beautiful day | u2 | rock | 2000s | 7:54 | local | 79 |
| mike | still lovin you | scorpions | metal | 1980s | 1:03 | subscription network | 76 |
| gene | true | spandau ballet | dance | 1980s | 3:31 | subscription network | 72 |
| gary | heart of the night | poco | rock | 1970s | 0:42 | subscription network | 67 |
| gary | roundabout | yes | rock | 1970s | 6:11 | buy/download | 67 |
| gene | alison | elvis costello | alternative | 1980s | 5:51 | buy/download | 65 |
| gary | run to the hills | iron maiden | metal | 1970s | 7:21 | local | 64 |
| mike | hound dog | elvis presley | rock | 1980s | 6:19 | buy/download | 55 |
| waymen | something more | sugarland | country | 2000s | 0:37 | subscription network | 25 |

U.S. PATENT DOCUMENTS

| | | |
|---|---|---|
| 6,314,420 B1 | 11/2001 | Lang et al. |
| 6,317,722 B1 | 11/2001 | Jacobi et al. |
| 6,353,823 B1 | 3/2002 | Kumar |
| 6,388,714 B1 | 5/2002 | Schein et al. |
| 6,438,579 B1 | 8/2002 | Hosken |
| 6,498,955 B1 | 12/2002 | McCarthy et al. |
| 6,526,411 B1 | 2/2003 | Ward |
| 6,567,797 B1 | 5/2003 | Schuetze et al. |
| 6,587,127 B1 * | 7/2003 | Leeke et al. .................. 715/765 |
| 6,587,850 B2 * | 7/2003 | Zhai .............................. 707/748 |
| 6,609,253 B1 | 8/2003 | Swix et al. |
| 6,615,208 B1 | 9/2003 | Behrens et al. |
| 6,629,104 B1 | 9/2003 | Parulski et al. |
| 6,636,836 B1 | 10/2003 | Pyo |
| 6,654,786 B1 | 11/2003 | Fox et al. |
| 6,662,231 B1 | 12/2003 | Drosset et al. |
| 6,670,537 B2 | 12/2003 | Hughes et al. |
| 6,694,482 B1 | 2/2004 | Arellano et al. |
| 6,754,904 B1 * | 6/2004 | Cooper et al. .................. 725/32 |
| 6,757,517 B2 | 6/2004 | Chang |
| 6,757,691 B1 | 6/2004 | Welsh et al. |
| 6,801,909 B2 | 10/2004 | Delgado et al. |
| 6,865,565 B2 | 3/2005 | Rainsberger et al. |
| 6,904,264 B1 | 6/2005 | Frantz |
| 6,912,528 B2 | 6/2005 | Homer |
| 6,941,275 B1 | 9/2005 | Swierczek |
| 6,941,324 B2 | 9/2005 | Plastina et al. |
| 6,947,922 B1 | 9/2005 | Glance |
| 6,973,475 B2 | 12/2005 | Kenyon et al. |
| 6,976,228 B2 | 12/2005 | Bernhardson |
| 6,986,136 B2 | 1/2006 | Simpson et al. |
| 6,987,221 B2 | 1/2006 | Platt |
| 6,990,453 B2 | 1/2006 | Wang et al. |
| 7,013,301 B2 | 3/2006 | Holm et al. |
| 7,035,871 B2 * | 4/2006 | Hunt et al. ............................ 1/1 |
| 7,047,406 B2 | 5/2006 | Schleicher et al. |
| 7,072,846 B1 | 7/2006 | Robinson |
| 7,072,886 B2 | 7/2006 | Salmenkaita et al. |
| 7,075,000 B2 | 7/2006 | Gang et al. |
| 7,076,553 B2 | 7/2006 | Chan et al. |
| 7,085,747 B2 | 8/2006 | Schaffer et al. |
| 7,089,248 B1 | 8/2006 | King et al. |
| 7,096,234 B2 | 8/2006 | Plastina et al. |
| 7,120,619 B2 | 10/2006 | Drucker et al. |
| 7,139,757 B1 | 11/2006 | Apollonsky et al. |
| 7,145,678 B2 | 12/2006 | Simpson et al. |
| 7,146,627 B1 | 12/2006 | Ismail et al. |
| 7,171,174 B2 | 1/2007 | Ellis et al. |
| 7,177,872 B2 | 2/2007 | Schwesig et al. |
| 7,219,145 B2 | 5/2007 | Chmaytelli et al. |
| 7,222,187 B2 | 5/2007 | Yeager et al. |
| 7,240,358 B2 | 7/2007 | Horn et al. |
| 7,277,955 B2 | 10/2007 | Elliott |
| 7,283,992 B2 | 10/2007 | Liu et al. |
| 7,296,032 B1 | 11/2007 | Beddow |
| 7,305,449 B2 | 12/2007 | Simpson et al. |
| 7,340,481 B1 | 3/2008 | Baer et al. |
| 7,356,187 B2 * | 4/2008 | Shanahan et al. ............. 382/224 |
| 7,437,364 B1 | 10/2008 | Fredricksen et al. |
| 7,441,041 B2 | 10/2008 | Williams et al. |
| 7,444,339 B2 | 10/2008 | Matsuda et al. |
| 7,457,790 B2 | 11/2008 | Kochunni et al. |
| 7,463,890 B2 | 12/2008 | Herz et al. |
| 7,469,283 B2 | 12/2008 | Eyal et al. |
| 7,496,623 B2 | 2/2009 | Szeto et al. |
| 7,509,291 B2 | 3/2009 | McBride et al. |
| 7,512,658 B2 | 3/2009 | Brown et al. |
| 7,523,156 B2 | 4/2009 | Giacalone, Jr. |
| 7,548,915 B2 | 6/2009 | Ramer et al. |
| 7,590,546 B2 | 9/2009 | Chuang |
| 7,594,246 B1 | 9/2009 | Billmaier et al. |
| 7,614,006 B2 | 11/2009 | Molander |
| 7,623,843 B2 | 11/2009 | Squibbs |
| 7,627,644 B2 | 12/2009 | Slack-Smith |
| 7,644,166 B2 | 1/2010 | Appelman et al. |
| 7,653,654 B1 | 1/2010 | Sundaresan |
| 7,676,753 B2 | 3/2010 | Bedingfield |
| 7,680,959 B2 | 3/2010 | Svendsen |
| 7,720,871 B2 | 5/2010 | Rogers et al. |
| 7,725,494 B2 | 5/2010 | Rogers et al. |
| 7,730,216 B1 | 6/2010 | Issa et al. |
| 7,734,569 B2 | 6/2010 | Martin et al. |
| 7,751,773 B2 | 7/2010 | Linden |
| 7,761,399 B2 | 7/2010 | Evans |
| 7,765,192 B2 | 7/2010 | Svendsen |
| 7,805,129 B1 | 9/2010 | Issa et al. |
| 7,827,110 B1 | 11/2010 | Wieder |
| 7,877,387 B2 | 1/2011 | Hangartner |
| 7,970,922 B2 | 6/2011 | Svendsen |
| 8,059,646 B2 | 11/2011 | Svendsen et al. |
| 8,200,602 B2 | 6/2012 | Farrelly |
| 2001/0013009 A1 | 8/2001 | Greening et al. |
| 2001/0021914 A1 | 9/2001 | Jacobi et al. |
| 2001/0025259 A1 | 9/2001 | Rouchon |
| 2002/0052207 A1 | 5/2002 | Hunzinger |
| 2002/0052674 A1 | 5/2002 | Chang et al. |
| 2002/0052873 A1 | 5/2002 | Delgado et al. |
| 2002/0082901 A1 | 6/2002 | Dunning et al. |
| 2002/0087382 A1 | 7/2002 | Tiburcio |
| 2002/0103796 A1 | 8/2002 | Hartley |
| 2002/0108112 A1 | 8/2002 | Wallace et al. |
| 2002/0116533 A1 | 8/2002 | Holliman et al. |
| 2002/0138836 A1 | 9/2002 | Zimmerman |
| 2002/0165793 A1 | 11/2002 | Brand et al. |
| 2002/0178057 A1 | 11/2002 | Bertram et al. |
| 2002/0194325 A1 | 12/2002 | Chmaytelli et al. |
| 2002/0194356 A1 | 12/2002 | Chan et al. |
| 2003/0001907 A1 | 1/2003 | Bergsten et al. |
| 2003/0005074 A1 | 1/2003 | Herz et al. |
| 2003/0014407 A1 | 1/2003 | Blatter et al. |
| 2003/0018799 A1 | 1/2003 | Eyal |
| 2003/0046399 A1 | 3/2003 | Boulter et al. |
| 2003/0055516 A1 | 3/2003 | Gang et al. |
| 2003/0055657 A1 | 3/2003 | Yoshida et al. |
| 2003/0066068 A1 | 4/2003 | Gutta et al. |
| 2003/0069806 A1 | 4/2003 | Konomi et al. |
| 2003/0084044 A1 | 5/2003 | Simpson et al. |
| 2003/0084086 A1 | 5/2003 | Simpson et al. |
| 2003/0084151 A1 | 5/2003 | Simpson et al. |
| 2003/0089218 A1 | 5/2003 | Gang et al. |
| 2003/0097186 A1 | 5/2003 | Gutta et al. |
| 2003/0115167 A1 | 6/2003 | Sharif et al. |
| 2003/0135513 A1 | 7/2003 | Quinn et al. |
| 2003/0137531 A1 | 7/2003 | Katinsky et al. |
| 2003/0149581 A1 | 8/2003 | Chaudhri et al. |
| 2003/0149612 A1 | 8/2003 | Berghofer et al. |
| 2003/0153338 A1 | 8/2003 | Herz et al. |
| 2003/0160770 A1 | 8/2003 | Zimmerman |
| 2003/0191753 A1 | 10/2003 | Hoch |
| 2003/0227478 A1 * | 12/2003 | Chatfield ....................... 345/751 |
| 2003/0229537 A1 | 12/2003 | Dunning et al. |
| 2003/0232614 A1 | 12/2003 | Squibbs |
| 2003/0236582 A1 | 12/2003 | Zamir et al. |
| 2003/0237093 A1 | 12/2003 | Marsh |
| 2004/0003392 A1 | 1/2004 | Trajkovic et al. |
| 2004/0019497 A1 | 1/2004 | Volk et al. |
| 2004/0034441 A1 | 2/2004 | Eaton et al. |
| 2004/0073919 A1 | 4/2004 | Gutta |
| 2004/0088271 A1 | 5/2004 | Cleckler |
| 2004/0091235 A1 | 5/2004 | Gutta |
| 2004/0107821 A1 | 6/2004 | Alcalde et al. |
| 2004/0128286 A1 | 7/2004 | Yasushi et al. |
| 2004/0133657 A1 | 7/2004 | Smith et al. |
| 2004/0133908 A1 | 7/2004 | Smith et al. |
| 2004/0133914 A1 | 7/2004 | Smith et al. |
| 2004/0137882 A1 * | 7/2004 | Forsyth ....................... 455/414.1 |
| 2004/0162783 A1 | 8/2004 | Gross |
| 2004/0162830 A1 | 8/2004 | Shirwadkar et al. |
| 2004/0181540 A1 | 9/2004 | Jung et al. |
| 2004/0186733 A1 | 9/2004 | Loomis et al. |
| 2004/0199527 A1 | 10/2004 | Morain et al. |
| 2004/0215793 A1 | 10/2004 | Ryan et al. |
| 2004/0216108 A1 | 10/2004 | Robbin |
| 2004/0224638 A1 | 11/2004 | Fadell et al. |
| 2004/0252604 A1 | 12/2004 | Johnson et al. |
| 2004/0254911 A1 | 12/2004 | Grasso et al. |
| 2004/0260778 A1 | 12/2004 | Banister et al. |

| | | |
|---|---|---|
| 2004/0267604 A1 | 12/2004 | Gross |
| 2005/0020223 A1 | 1/2005 | Ellis et al. |
| 2005/0021420 A1 | 1/2005 | Michelitsch et al. |
| 2005/0021470 A1 | 1/2005 | Martin et al. |
| 2005/0021678 A1 | 1/2005 | Simyon et al. |
| 2005/0022239 A1 | 1/2005 | Meuleman |
| 2005/0026559 A1 | 2/2005 | Khedouri |
| 2005/0038819 A1 | 2/2005 | Hicken et al. |
| 2005/0038876 A1 | 2/2005 | Chaudhuri |
| 2005/0060264 A1 | 3/2005 | Schrock et al. |
| 2005/0060666 A1 | 3/2005 | Hoshino et al. |
| 2005/0065976 A1 | 3/2005 | Holm et al. |
| 2005/0071418 A1 | 3/2005 | Kjellberg et al. |
| 2005/0091107 A1* | 4/2005 | Blum ............................... 705/14 |
| 2005/0120053 A1 | 6/2005 | Watson |
| 2005/0125221 A1 | 6/2005 | Brown et al. |
| 2005/0125222 A1 | 6/2005 | Brown et al. |
| 2005/0131866 A1 | 6/2005 | Badros |
| 2005/0138198 A1 | 6/2005 | May |
| 2005/0154608 A1 | 7/2005 | Paulson et al. |
| 2005/0154764 A1 | 7/2005 | Riegler et al. |
| 2005/0154767 A1 | 7/2005 | Sako |
| 2005/0158028 A1 | 7/2005 | Koba |
| 2005/0166245 A1 | 7/2005 | Shin et al. |
| 2005/0197961 A1 | 9/2005 | Miller et al. |
| 2005/0228830 A1 | 10/2005 | Plastina et al. |
| 2005/0246391 A1 | 11/2005 | Gross |
| 2005/0251455 A1 | 11/2005 | Boesen |
| 2005/0251807 A1 | 11/2005 | Weel |
| 2005/0256756 A1 | 11/2005 | Lam et al. |
| 2005/0256866 A1 | 11/2005 | Lu et al. |
| 2005/0267944 A1 | 12/2005 | Little, II |
| 2005/0278377 A1 | 12/2005 | Mirrashidi et al. |
| 2005/0278758 A1 | 12/2005 | Bodlaender |
| 2005/0286546 A1 | 12/2005 | Bassoli et al. |
| 2005/0289236 A1 | 12/2005 | Hull et al. |
| 2006/0004640 A1 | 1/2006 | Swierczek |
| 2006/0004704 A1 | 1/2006 | Gross |
| 2006/0008256 A1 | 1/2006 | Khedouri et al. |
| 2006/0010167 A1 | 1/2006 | Grace et al. |
| 2006/0015378 A1 | 1/2006 | Mirrashidi et al. |
| 2006/0020662 A1 | 1/2006 | Robinson |
| 2006/0026048 A1 | 2/2006 | Kolawa et al. |
| 2006/0048059 A1 | 3/2006 | Etkin |
| 2006/0053080 A1 | 3/2006 | Edmonson et al. |
| 2006/0064716 A1 | 3/2006 | Sull et al. |
| 2006/0074750 A1* | 4/2006 | Clark et al. ..................... 705/14 |
| 2006/0083119 A1 | 4/2006 | Hayes |
| 2006/0085383 A1 | 4/2006 | Mantle et al. |
| 2006/0100924 A1 | 5/2006 | Tevanian, Jr. |
| 2006/0126135 A1 | 6/2006 | Stevens et al. |
| 2006/0130120 A1 | 6/2006 | Brandyberry et al. |
| 2006/0143236 A1* | 6/2006 | Wu ............................. 707/104.1 |
| 2006/0156242 A1 | 7/2006 | Bedingfield |
| 2006/0167991 A1 | 7/2006 | Heikes et al. |
| 2006/0173910 A1* | 8/2006 | McLaughlin ............... 707/104.1 |
| 2006/0174277 A1 | 8/2006 | Sezan et al. |
| 2006/0190616 A1 | 8/2006 | Mayerhofer et al. |
| 2006/0195479 A1 | 8/2006 | Spiegelman et al. |
| 2006/0195512 A1* | 8/2006 | Rogers et al. ................. 709/203 |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1* | 8/2006 | Beaupre ........................ 709/203 |
| 2006/0195521 A1* | 8/2006 | New et al. ..................... 709/204 |
| 2006/0195789 A1 | 8/2006 | Rogers et al. |
| 2006/0195790 A1 | 8/2006 | Beaupre et al. |
| 2006/0200432 A1 | 9/2006 | Flinn et al. |
| 2006/0200435 A1 | 9/2006 | Flinn et al. |
| 2006/0206582 A1 | 9/2006 | Finn |
| 2006/0218187 A1 | 9/2006 | Plastina et al. |
| 2006/0224757 A1 | 10/2006 | Fang et al. |
| 2006/0227673 A1 | 10/2006 | Yamashita et al. |
| 2006/0242201 A1 | 10/2006 | Cobb et al. |
| 2006/0242206 A1 | 10/2006 | Brezak et al. |
| 2006/0247980 A1 | 11/2006 | Mirrashidi et al. |
| 2006/0248209 A1 | 11/2006 | Chiu et al. |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0273155 A1 | 12/2006 | Thackston |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0288074 A1 | 12/2006 | Rosenberg |
| 2006/0293909 A1* | 12/2006 | Miyajima et al. .................. 705/1 |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0033292 A1 | 2/2007 | Sull et al. |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1 | 4/2007 | Minor |
| 2007/0083929 A1 | 4/2007 | Sprosts et al. |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1 | 5/2007 | Casey et al. |
| 2007/0104138 A1 | 5/2007 | Rudolf et al. |
| 2007/0106672 A1 | 5/2007 | Sighart et al. |
| 2007/0106693 A1 | 5/2007 | Houh et al. |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1 | 5/2007 | Houh et al. |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0195373 A1 | 8/2007 | Singh |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0220575 A1 | 9/2007 | Cooper et al. |
| 2007/0233736 A1 | 10/2007 | Xiong et al. |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0264982 A1 | 11/2007 | Nguyen et al. |
| 2007/0265870 A1 | 11/2007 | Song et al. |
| 2007/0269169 A1 | 11/2007 | Stix et al. |
| 2007/0277202 A1* | 11/2007 | Lin et al. ........................... 725/46 |
| 2007/0282949 A1 | 12/2007 | Fischer et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0040313 A1 | 2/2008 | Schachter |
| 2008/0046948 A1 | 2/2008 | Verosub |
| 2008/0052371 A1 | 2/2008 | Partovi et al. |
| 2008/0052380 A1 | 2/2008 | Morita et al. |
| 2008/0052630 A1 | 2/2008 | Rosenbaum |
| 2008/0059422 A1 | 3/2008 | Tenni et al. |
| 2008/0059576 A1 | 3/2008 | Liu et al. |

| | | | |
|---|---|---|---|
| 2008/0080774 A1 | 4/2008 | Jacobs et al. |
| 2008/0085769 A1 | 4/2008 | Lutnick et al. |
| 2008/0091771 A1 | 4/2008 | Allen et al. |
| 2008/0120501 A1 | 5/2008 | Jannink et al. |
| 2008/0133601 A1 | 6/2008 | Martin Cervera et al. |
| 2008/0133763 A1 | 6/2008 | Clark et al. |
| 2008/0134039 A1 | 6/2008 | Fischer et al. |
| 2008/0134043 A1 | 6/2008 | Georgis et al. |
| 2008/0134053 A1 | 6/2008 | Fischer |
| 2008/0141136 A1 | 6/2008 | Ozzie et al. |
| 2008/0147482 A1 | 6/2008 | Messing et al. |
| 2008/0147711 A1 | 6/2008 | Spiegelman et al. |
| 2008/0147876 A1 | 6/2008 | Campbell et al. |
| 2008/0160983 A1 | 7/2008 | Poplett et al. |
| 2008/0176562 A1 | 7/2008 | Howard |
| 2008/0178094 A1 | 7/2008 | Ross |
| 2008/0181536 A1 | 7/2008 | Linden |
| 2008/0189391 A1 | 8/2008 | Koberstein et al. |
| 2008/0189655 A1 | 8/2008 | Kol |
| 2008/0195657 A1 | 8/2008 | Naaman et al. |
| 2008/0195664 A1 | 8/2008 | Maharajh et al. |
| 2008/0208823 A1 | 8/2008 | Hicken |
| 2008/0209013 A1 | 8/2008 | Weel |
| 2008/0235632 A1 | 9/2008 | Holmes |
| 2008/0242221 A1 | 10/2008 | Shapiro et al. |
| 2008/0242280 A1 | 10/2008 | Shapiro et al. |
| 2008/0243733 A1 | 10/2008 | Black |
| 2008/0244681 A1 | 10/2008 | Gossweiler et al. |
| 2008/0250067 A1 | 10/2008 | Svendsen |
| 2008/0250312 A1 | 10/2008 | Curtis |
| 2008/0270561 A1 | 10/2008 | Tang et al. |
| 2008/0276279 A1 | 11/2008 | Gossweiler et al. |
| 2008/0288588 A1 | 11/2008 | Andam et al. |
| 2008/0306826 A1 | 12/2008 | Kramer et al. |
| 2009/0007198 A1 | 1/2009 | Lavender et al. |
| 2009/0042545 A1 | 2/2009 | Avital et al. |
| 2009/0055396 A1 | 2/2009 | Svendsen et al. |
| 2009/0069911 A1 | 3/2009 | Stefik |
| 2009/0069912 A1 | 3/2009 | Stefik |
| 2009/0070184 A1 | 3/2009 | Svendsen |
| 2009/0070350 A1 | 3/2009 | Wang |
| 2009/0076881 A1 | 3/2009 | Svendsen |
| 2009/0077041 A1 | 3/2009 | Eyal et al. |
| 2009/0077052 A1 | 3/2009 | Farrelly |
| 2009/0077084 A1 | 3/2009 | Svendsen |
| 2009/0077124 A1 | 3/2009 | Spivack et al. |
| 2009/0077220 A1 | 3/2009 | Svendsen et al. |
| 2009/0083116 A1 | 3/2009 | Svendsen |
| 2009/0083117 A1 | 3/2009 | Svendsen et al. |
| 2009/0083362 A1 | 3/2009 | Svendsen |
| 2009/0129671 A1 | 5/2009 | Hu et al. |
| 2010/0031366 A1 | 2/2010 | Knight et al. |
| 2010/0185732 A1 | 7/2010 | Hyman |
| 2011/0016483 A1 | 1/2011 | Opdycke |
| 2011/0034121 A1 | 2/2011 | Ng et al. |
| 2012/0072610 A1 | 3/2012 | Svendsen |
| 2012/0072852 A1 | 3/2012 | Svendsen et al. |

FOREIGN PATENT DOCUMENTS

| | | |
|---|---|---|
| EP | 0898278 A2 | 2/1999 |
| EP | 1536352 A1 | 6/2005 |
| EP | 1835455 A1 | 9/2007 |
| GB | 2372850 A | 9/2002 |
| GB | 2397205 A | 7/2004 |
| JP | 2005-321668 | 11/2005 |
| WO | 0125947 A1 | 4/2001 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006075032 A1 | 7/2006 |
| WO | 2006/126135 A2 | 11/2006 |
| WO | 2007092053 A1 | 8/2007 |

OTHER PUBLICATIONS

"Babulous :: Keep it loud," http://www.babulous.com/home.jhtml, copyright 2009 Babulous, Inc., printed Mar. 26, 2009, 2 pages.

"Ringo: Soc"Ringo: Social Information Filtering for Music Recommendation, http://jolomo.net/ringo.html, printed Aug. 3, 2009, 1 page.

"Tour's Profile," http://mog.com/Tour, copyright 2006-2009 Mog Inc., printed Aug. 3, 2009, 11 pages.

"Last.fm—Wikipedia, the free encyclopedia," http://en.wikipedia.org/wiki/Last.fm, last modifed on Aug. 8, 2006, printed Aug. 8, 2006, 7 pages.

"MusicStrands Rustles Funding Following Mobile Announcement," http://www.digitalmusicnews.com/results?title=musicstrands, Digital Music News, Mar. 6, 2006, printed Aug. 8, 2006, p. 3 of 5.

"Yahoo Music Jukebox—Wikipedia, the free encyclopedia," http://en.wikipedia.org/wiki/Yahoo_music_engine, last modified on Aug. 3, 2006, printed on Aug. 8, 2006, 1 page.

"Mercora—Music Search and Internet Radio Network," www.mercora.com/overview.asp, copyright 2004-2006 Mercora, Inc., printed Aug. 8, 2006, 1 page.

"LimeWire—Wikipedia, the free encyclopedia," http://en.wikipedia.org/wiki/Limewire, last modified on Aug. 6, 2006, printed on Aug. 8, 2006, 2 pages.

"Soundflavor DJ for iTunes!," http://www.soundflavor.com/, copyright 2003-2007 Soundflavor, Inc., printed Feb. 7, 2007, 1 page.

"MusicIP—The Music Search Engine," http://www.musicip.com/, copyright 2006-2007 MusicIP Corporation, printed Feb. 7, 2007, 1 page.

"Last.fm—The Social Music Revolution," http://www.last.fm/, printed Feb. 7, 2007, 2 pages.

"Webjay—Playlist Community," http://www.webjay.org/, copyright 2006 Yahoo! Inc., printed Feb. 7, 2007, 5 pages.

"betterPropaganda—Free MP3s and music videos," http://www.betterpropaganda.com/, copyright 2004-2005 betterPropaganda, printed Feb. 7, 2007, 4 pages.

"Mercora—Music Search and Internet Radio Network," http://search.mercora.com/v6/_front/web.jsp, printed Feb. 7, 2007, 1 page.

"MP3 music download website, eMusic," http://www.emusic.com/, copyright 2007 eMusic.com Inc., printed Feb. 7, 2007, 1 page.

"Welcome to the Musicmatch Guide," http://www.mmguide.musicmatch.com/, copyright 2001-2004 Musicmatch, Inc., printed Feb. 7, 2007, 1 page.

"UpTo11.net—Music Recommendations and Search," http://www.upto11.net/, copyright 2005-2006 Upto11.net, printed Feb. 7, 2007, 1 page.

"Loomia—Personalized Recommendations for Media, Content and Retail Sites," http://www.loomia.com/, copyright 2006-2007 Loomia Inc., printed Feb. 7, 2007, 2 pages.

"Try Napster free for 7 Days—Play and download music without paying per song," http://www.napster.com/choose/index.html, copyright 2003-2007 Napster, LLC, printed Feb. 7, 2007, 1 page.

Barrie-Anthony, Steven, "That song sounds familiar," Los Angeles Times, Feb. 3, 2006, available from http://www.calendarlive.com/printedition/calendar/cl-et-pandora3feb03,0,7458778.story?track=tottext,0,19432.story?track=tothtml, 5 pages.

Yahoo! Music downloaded archival page from www.archive.org for Jun. 20, 2005, copyright 2005 Yahoo! Inc., 14 pages.

Huang, Yao-Chang et al., "An Audio Recommendation System Based on Audio Signature Description Scheme in MPEG-7 Audio," IEEE International Conference on Multimedia and Expo (ICME), copyright 2004 IEEE, pp. 639-642.

Kosugi, Naoko et al., "A Practical Query-By-Humming System for a Large Music Database," Oct. 2000, International Multimedia Conference, Proceedings of the 8th ACM International Conference on Multimedia, copyright 2000 ACM, pp. 333-342.

"Amazon.com: Online Shopping for Electronics, Apparel, Computers, Books, DVDs & m . . . ," http://www.amazon.com/, copyright 1996-2007 Amazon.com, Inc. or its affiliates, printed Oct. 26, 2007, 4 pages.

"Apple—iPod classic," http://www.apple.com/ipodclassic/, printed Oct. 26, 2007, 1 page.

"Billboard.biz—Music Business—Billboard Charts—Album Sales—Concert Tours," http://www.billboard.biz/bbbiz/index.jsp, copyright 2007 Nielsen Business Media, Inc., printed Oct. 26, 2007, 3 pages.

"Bluetooth.com—Learn," http://www.bluetooth.com/Bluetooth/Learn/, copyright 2007 Bluetooth SIG, Inc., printed Oct. 26, 2007, 1 page.
"The Classic TV Database—Your Home for Classic TV!—www.classic-tv.com," http://www.classic-tv.com/, copyright The Classic TV Database—www.classic-tv.com, printed Feb. 7, 2007, 3 pages.
"Genielab::Music Recommendation System," http://web.archive.org/web/20060813000442/http://genielab.com/, copyright 2005 GenieLab, LLC, printed Oct. 30, 2007, 1 page.
"Gracenote Playlist," Revised Dec. 29, 2005, copyright 2005 Gracenote, 2 pages.
"Gracenote Playlist Plus," Revised Dec. 29, 2005, copyright 2005 Gracenote, 2 pages.
"IEEE 802.11—Wikipedia, the free encyclopedia," http://en.wikipedia.org/wiki/IEEE_802.11, printed Oct. 26, 2007, 5 pages.
"iLike TM—Home," http://www.ilike.com/, copyright 2007 iLike, printed May 17, 2007, 2 pages.
"The Internet Movie Database (IMDb)," http://www.imdb.com/, copyright 1990-2007 Internet Movie Database Inc., printed Feb. 7, 2007, 3 pages.
"Liveplasma music, movies, search engine and discovery engine," http://www.liveplasma.com/, printed May 17, 2007, 1 page.
"Mongomusic.com—The Best Download mp3 Resources and Information. This website is for sale!," http://www.mongomusic.com/, printed May 17, 2007, 2 pages.
"MusicGremlin," http://www.musicgremlin.com/StaticContent.aspx?id=3, copyright 2005, 2006, 2007 MusicGremlin, Inc., printed Oct. 26, 2007, 1 page.
"FAQ," http://blog.pandora.com/faq/, copyright 2005-2006 Pandora Media, Inc., printed Aug. 8, 2006, 20 pages.
"Pandora Radio—Listen to Free Internet Radio, Find New Music," http://www.pandora.com/mgp, copyright 2005-2007 Pandora Media, Inc., printed Oct. 26, 2007, 1 page.
"Rhapsody—Full-length music, videos and more—FREE," http://www.rhapsody.com/welcome.html, copyright 2001-2007 Listen.com, printed Feb. 7, 2007, 1 page.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.
"Music Downloads—Over 2 Million Songs—Try it Free—Yahoo! Music," http://music.yahoo.com/ymu/default.asp, copyright 2006 Yahoo! Inc., printed Feb. 7, 2007, 1 page.
"YouTube—Broadcast Yourself," http://www.youtube.com/, copyright 2007 YouTube, LLC, printed Oct. 26, 2007, 2 pages.
"Apple—iPod + iTunes," http://apple.com/itunes/, TM & copyright 2007 Paramount Pictures, printed Feb. 7, 2007, 2 pages.
"Pandora Internet Radio—Find New Music, Listen to Free Web Radio," http://www.pandora.com/, copyright 2005-2007 Pandora Media, Inc., printed Feb. 7, 2007, 1 page.
"MyStrands Download," http://www.mystrands.com/overview.vm, copyright 2003-2007 MediaStrands, Inc., printed Feb. 7, 2007, 3 pages.
"Napster—All the Music You Want," http://www.napster.com/using_napster/all_the_music_you_want.html, copyright 2003-2006 Napster, LLC, printed Feb. 7, 2007, 2 pages.
"Take a look at the Future of Mobile Music :: MUSIC GURU," http://www.symbian-freak.com/news/006/02/music_guru.htm, Feb. 23, 2006, copyright 2005 Symbian freak, printed Februray 7, 2007, 3 pages.
"Gracenote," http://www.gracenote.com, printed Feb. 7, 2007, 1 page.
"Whose Song is That, Anyway?," http://www.wired.com/news/digiwood/1,57634-0.html, Wired News, Feb. 12, 2003, copyright 2005 Lycos, Inc., printed Oct. 9, 2006, 3 pages.
"MUSICSTRANDS.COM Because Music is Social", 2006, copyright 2006 MusicStrands, Inc., 2 pages.
Badrul M. Sarwar et al., "Recommender Systems for Large-scale E-Commerce: Scalable Neighborhood Formation Using Clustering," 2002, 6 pages.
"GenieLab.com grants music lovers' wishes," http://media.barometer.orst.edu/home/index.cfm?event=displayArticlePrinterFriendly&uStory_id=5c420acf-a1fb-448c-8ffd-39ec4c448b6f, The Daily Barometer, Feb. 16, 2005, copyright 2007 The Daily Barometer, printed Feb. 16, 2007, 2 pages.
"That canadian girl—blog archive—GenieLab," http://www.thatcanadiangirl.co.uk/blog/2005/02/22/genielab/, Feb. 22, 2005, copyright 2007 Vero Pepperrell, 3 pages.
"Digital Tech Life—Download of the Week," http://www.digitaltechlife.com/category/download-of-the-week/, printed Feb. 16, 2007, 9 pages.
"Music Recommendations 1.0—MacUpdate," http://www.macupdate.com/info.php/id/19575, printed Feb. 16, 2007, 1 page.
"Instant Messenger—AIM—Instant Message Your Online Buddies for Free—AIM," http://dashboard.aim.com/aim, copyright 2007 AOL LLC, printed Nov. 8, 2007, 6 pages.
"Outlook Home Page—Microsoft Office Online," http://office.microsoft.com/en-us/outlook/default.aspx, copyright 2007 Microsoft Corporation, printed Nov. 8, 2007, 1 page.
"Thunderbird—Reclaim your inbox," http://www.mozilla.com/en-US/thunderbird/, copyright 2005-2007 Mozilla, printed Nov. 8, 2007, 2 pages.
"RYM FAQ—Rate Your Music," http://rateyourmusic.com/faq/, copyright 2000-2007 rateyourmusic.com, printed Nov. 8, 2007, 14 pages.
"Trillian (software)—Wikipedia, the free encyclopedia," http://en.wikipedia.org/wiki/Trillian_(instant_messenger), printed Nov. 8, 2007, 11 pages.
"Not safe for work—Wikipedia, the free encyclopedia," http://en.wikipedia.org/wiki/Work_safe, printed Nov. 8, 2007, 2 pages.
"Zune.net—How-To—Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.
"LAUNCHcast Radio—Yahoo! Messenger," http://messenger.yahoo.com/launch.php, copyright 2007 Yahoo! Inc., printed Nov. 8, 2007, 1 page.
"Goombah—Preview," http://www.goombah.com/preview.html, printed Jan. 8, 2008, 5 pages.
Jeff Mascia et al., "Lifetrak: Music in Tune With Your Life," copyright 2006, 11 pages.
"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.
"Identifying iPod models," http://support.apple.com/kb/HT1353, printed Feb. 24, 2010, 13 pages.
Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.
"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.
"Hulu—About," www.hulu.com/about/product_tour, copyright 2010 Hulu LLC, printed Jun. 15, 2010, 2 pages.
Nilson, Martin, "id3v2.4.0-frames—ID3.org," http://www.id3.org/id3v2.4.0-frames, Nov. 1, 2000, copyright 1998-2009, printed Jun. 15, 2010, 31 pages.
"Songbird," http://getsongbird.com/, copyright 2010 Songbird, printed Jun. 15, 2010, 2 pages.
"SongReference," http://songreference.com/, copyright 2008, SongReference.com, printed Jun. 15, 2010, 1 page.
"Anthem—Overview," at <http://www.intercastingcorp.com/platform/anthem>, copyright 2004-2007 Intercasting Corp., printed Jan. 16, 2008, 2 pages.
Jun Wang et al., "Music Recommender System for Wi-Fi Walkman," No. ICT-2003-01 in the ICT Group Technical Report Series, 2003, 23 pages.
"MyStrands Labs: Patent-pending Technologies," at <http://labs.mystrands.com/patents.html>, printed Feb. 7, 2007, 5 pages.
Wang, J. et al., "Wi-Fi Walkman: A wireless handhold that shares and recommend music on peer-to-peer networks," in Proceedings of Embedded Processors for Multimedia and Communications II, part of the IS&T/SPIE Symposium on Electronic Imaging 2005, Jan. 16-20, 2005, San Jose, California, Proceedings published Mar. 8, 2005, found at <http://citeseerx.ist.psu.edu/viewdoc/download?doi=10.1.1.108.3459&rep=rep1&type=pdf>, 10 pages.

* cited by examiner

| user | song | artist | genre | decade | time | availability | score |
|---|---|---|---|---|---|---|---|
| hugh | sweet emotion | aerosmith | rock | 1970s | 45:32:21 | local | 95 |
| waymen | so what | miles davis | jazz | 1960s | 6:37 | find | 94 |
| gary | dance in my sleep | dave adams | alternative | 1980s | 4:25 | subscription network | 92 |
| waymen | come away with me | norah jones | jazz | 2000s | 4:56 | subscription network | 88 |
| mike | walk the line | johnny cash | country | 1970s | 5:31 | buy/download | 86 |
| hugh | say hey | the tubes | alternative | 1980s | 20:54:24 | local | 86 |
| hugh | you get what you give | new radicals | alternative | 1990s | 4:12:03 | local | 83 |
| hugh | tenderness | general public | new wave | 1980s | 25:32:21 | local | 83 |
| hugh | running with the devil | van halen | rock | 1970s | 12:35:11 | local | 82 |
| gene | rebel yell | billy idol | punk | 1980s | 0:32 | subscription network | 81 |
| gene | beautiful day | u2 | rock | 2000s | 7:54 | local | 79 |
| mike | still lovin you | scorpions | metal | 1980s | 1:03 | subscription network | 76 |
| gene | true | spandau ballet | dance | 1980s | 3:31 | subscription network | 72 |
| gary | heart of the night | poco | rock | 1970s | 0:42 | subscription network | 67 |
| gary | roundabout | yes | rock | 1970s | 6:11 | buy/download | 67 |
| gene | alison | elvis costello | alternative | 1980s | 5:51 | buy/download | 65 |
| gary | run to the hills | iron maiden | metal | 1970s | 7:21 | local | 64 |
| mike | hound dog | elvis presley | rock | 1980s | 6:19 | buy/download | 55 |
| waymen | something more | sugarland | country | 2000s | 0:37 | subscription network | 25 |

USER: HUGH

CURRENT SONG
CURRENT ALBUM

FIG. 13

USER: HUGH

CURRENT SONG
CURRENT ALBUM

| user | song | artist | genre | decade | time | availability | score |
|---|---|---|---|---|---|---|---|
| gary | dance in my sleep | dave adams | alternative | 1980s | 4:25 | subscription network | 92 |
| hugh | say hey | the tubes | alternative | 1980s | 20:54:24 | local | 86 |
| hugh | you get what you give | new radicals | alternative | 1990s | 4:12:03 | local | 83 |
| gene | alison | elvis costello | alternative | 1980s | 5:51 | buy/download | 65 |
| hugh | sweet emotion | aerosmith | rock | 1970s | 45:32:21 | local | 95 |
| hugh | running with the devil | van halen | rock | 1970s | 12:35:11 | local | 82 |
| gene | beautiful day | u2 | rock | 2000s | 7:54 | local | 79 |
| gary | heart of the night | poco | rock | 1970s | 0:42 | subscription network | 67 |
| gary | roundabout | yes | rock | 1970s | 6:11 | buy/download | 67 |
| mike | hound dog | elvis presley | rock | 1980s | 6:19 | buy/download | 55 |
| mike | still lovin you | scorpions | metal | 1980s | 1:03 | subscription network | 76 |
| gary | run to the hills | iron maiden | metal | 1970s | 7:21 | local | 64 |
| waymen | so what | miles davis | jazz | 1960s | 6:37 | find | 94 |
| waymen | come away with me | norah jones | jazz | 2000s | 4:56 | subscription network | 88 |
| gene | rebel yell | billy idol | punk | 1980s | 0:32 | subscription network | 81 |
| hugh | tenderness | general public | new wave | 1980s | 5:31 | local | 83 |
| gene | true | spandau ballet | dance | 1980s | 25:32:21 | subscription network | 72 |
| mike | walk the line | johnny cash | country | 1970s | 3:31 | buy/download | 86 |
| waymen | something more | sugarland | country | 2000s | 0:37 | subscription network | 25 |

*FIG. 14*

GRAPHICAL USER INTERFACE SYSTEM FOR ALLOWING MANAGEMENT OF A MEDIA ITEM PLAYLIST BASED ON A PREFERENCE SCORING SYSTEM

RELATED APPLICATIONS

This application is a continuation-in-part patent application of U.S. Application Ser. No. 11/484,130, filed Jul. 11, 2006, entitled P2P NETWORK FOR PROVIDING REAL TIME MEDIA RECOMMENDATIONS, now U.S. Pat. No. 7,680,959, issued Mar. 16, 2010 which is incorporated herein by reference in its entirety.

FIELD OF THE INVENTION

The present invention relates to graphical user interfaces (GUIs) and related systems provided on a peer device in a network, such as a peer-to-peer network, to allow a user to define user preferences and/or develop a user profile. The preferences and profile are used to filter media item recommendations received by the peer device, score the media item recommendations according to the user preferences and/or user profile, and allow management of a media item playlist on the peer device based on media item scoring.

BACKGROUND OF THE INVENTION

In recent years, there has been an enormous increase in the amount of digital media, such as music, available online. Services such as Apple's iTunes enable users to legally purchase and download music. Other services such as Yahoo! Music Unlimited and RealNetwork's Rhapsody provide access to millions of songs for a monthly subscription fee. As a result, music has become much more accessible to listeners worldwide. In this regard, graphical user interfaces are often provided to user devices to allow the user to retrieve, navigate and otherwise manage their media collection. However, the increased accessibility of music has only heightened a long-standing problem for the music industry, which is namely the issue of linking audiophiles with new music that matches their listening preferences.

Many companies, technologies, and approaches have emerged to address this issue of music recommendation. Some companies have taken an analytical approach. They review various attributes of a song, such as melody, harmony, lyrics, orchestration, vocal character, and the like, and assign a rating to each attribute. The ratings for each attribute are then assembled to create a holistic classification for the song that is then used by a recommendation engine. The recommendation engine typically requires that the user first identify a song that he or she likes. The recommendation engine then suggests other songs with similar attributions. Companies using this type of approach include Pandora (pandora.com), SoundFlavor (soundflavor.com), MusicIP (musicip.com), and MongoMusic (purchased by Microsoft in 2000).

Other companies take a communal approach. They make recommendations based on the collective wisdom of a group of users with similar musical tastes. These solutions first profile the listening habits of a particular user and then search similar profiles of other users to determine recommendations. Profiles are generally created in a variety of ways such as looking at a user's complete collection, the playcounts of their songs, their favorite playlists, and the like. Companies using this technology include Last.fm (last.fm), Music Strands (musicstrands.com), WebJay (webjay.org), Mercora (mercora.com), betterPropaganda (betterpropaganda.com), Loomia (loomia.com), eMusic (emusic.com), musicmatch (mmguide.musicmatch.com), genielab (genielab.com/), upto11 (upto11.net/), Napster (napster.com), and iTunes (itunes.com) with its celebrity playlists.

The problem with these traditional recommendation systems is that they fail to consider peer influences. For example, the media items that a particular teenager listens to and/or views may be highly influenced by the media items listened to or viewed by a group of the teenager's peers, such as his or her friends. Media item recommendations from a user's peers may be provided through a social network, such as, for example, a peer-to-peer network.

Similar to a company generating media item recommendations based on a user's profile, a user may desire to filter peer media item recommendations received by his or her peer device based on the user's preferences and profile. However, to effectively filter peer media item recommendations, the user has to provide information to the peer device from which user preferences may be determined and a user profile may be developed. In addition, the user may desire the ability to control the manner in which his or her preferences and profile are applied to the peer media item recommendations, and, generally, to manage the peer media item recommendations on the peer device.

Further, even though media item recommendations can be provided as an effective tool to target media items sent to a user, such as in a peer-to-peer network, the user may not desire to listen to or view all of the peer recommendations received by the user's peer device. The user must navigate through his or her media item collection on a graphical user interface to select media items of interest. The user's media collection, which may consist of user directed selections and received media item selections, may contain hundreds if not thousands of media items to navigate.

Thus, there exists a need to provide a mechanism to allow a user at a peer device to effectively provide user preferences and profile information used to generate media item recommendations as well as a system and method to allow a user to more effectively navigate among media item recommendations among a vast media collection.

SUMMARY OF THE INVENTION

The present invention provides graphical user interfaces (GUIs) and related systems for a peer device to provide user preferences and profile information used to generate media item recommendations. The GUIs also allow a user to navigate and filter through their media collection containing such media item recommendations based on a preference scoring system generated as a result of the user preferences and profile selections made by the user. In this manner, the peer device may be contained within a peer-to-peer (P2P) network. A client application executing on the peer device provides and enables the GUIs. One or more GUIs enable the user to provide information to weight various media item categories and attributes within the media item categories. The user provided weighting information is used to configure the user preferences.

Another of the GUIs may display a media item playlist containing a preference scoring column to allow the user to display and sort media recommendations on the GUI by preference score. The media item playlist GUI also displays a list of the users subscribing to the P2P network, the title of and information concerning media items recommended by the users, and media items stored locally on the peer device, and other related information. The score may be determined by applying preferences defined by information provided by the user of the peer device via the one or more GUIs provided by the present invention.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 13 illustrates an exemplary GUI displaying a playlist including both songs from a local music collection of a peer device and recommended songs from other peer devices, where the songs are sorted by a score determined based on user preferences according to one embodiment of the present invention;

FIG. 14 illustrates an exemplary GUI displaying a playlist including both songs from a local music collection of a peer device and recommended songs from other peer devices, where the songs are sorted by a both genre and score according to one embodiment of the present invention;

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides graphical user interfaces (GUIs) and related systems for a peer device to provide user preferences and profile information used to filter media item recommendations. The GUIs also allow a user to navigate through and sort his or her media item collection containing such media item recommendations based on a preference scoring system generated as a result of the user preferences and profile selections made by the user. In this manner, the peer device may be contained within a peer-to-peer (P2P) network. A client application executing on the peer device provides and enables the GUIs. One or more GUIs enable the user to provide information to weight various media item categories and attributes within the media item categories. The user provided weighting information is used to configure the user preferences.

Another of the GUIs may display a media item playlist containing a preference scoring column to allow the user to display and sort media recommendations on the GUI by preference score. The media item playlist GUI also displays a list of the users subscribing to the P2P network, the title of and information concerning media items recommended by the users, and media items stored locally on the peer device, and other related information. The score may be determined by applying preferences defined by information provided by the user of the peer device via the one or more GUIs provided by the present invention.

Before discussing the particular GUI systems provided as part of the present invention to enable a user to define preferences, a user profile, and display and sort media items by preference scoring, a discussion of a P2P system and network that allows the user to obtain media item recommendations is first discussed. Examples of the GUIs 42, 50, 92, 100, 118, 132, 142, 184, and 187 are illustrated in FIGS. 7, 8, 9, 10, 11, 12, 13, 14, 15, and 16, respectively, and described in more detail later in this application.

Figure 1:
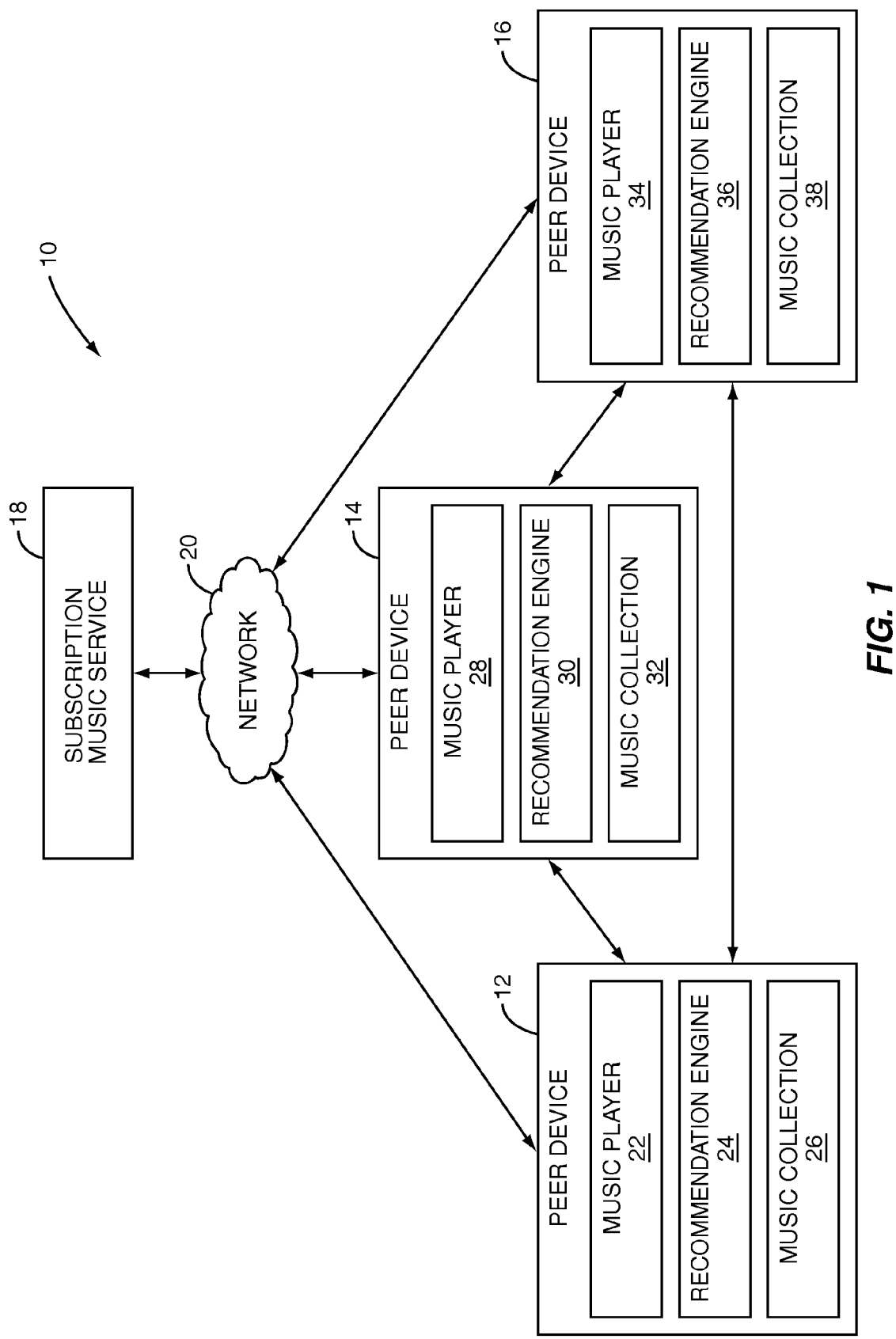
FIG. 1 illustrates a system incorporating a peer-to-peer (P2P) network for real time media recommendations according to one embodiment of the present invention.

FIG. 1 illustrates a system 10 incorporating a P2P network for providing real time song recommendations according to one embodiment of the present invention. Note that while the discussion herein focuses on song recommendations for clarity and ease of discussion, the present invention is equally applicable to providing recommendations for other types of media presentations such as video presentations, as will be apparent to one of ordinary skill in the art upon reading this disclosure. Exemplary video presentations are movies, television programs, and the like. In general, the system 10 includes a number of peer devices 12-16 which are optionally connected to a subscription music service 18 via a network 20, which may be a distributed public network such as, but not limited to, the Internet. Note that while three peer devices 12-16 are illustrated, the present invention may be used with any number of two or more peer devices.

In this embodiment, the peer devices 12-16 are preferably portable devices such as, but not limited to, portable audio players, mobile telephones, Personal Digital Assistants (PDAs), or the like having audio playback capabilities. However, the peer devices 12-16 may alternatively be stationary devices such as a personal computer or the like. The peer devices 12-16 include local wireless communication interfaces (FIG. 15) communicatively coupling the peer devices 12-16 to form a peer-to-peer (P2P) network. The wireless communication interfaces may provide wireless communication according to, for example, one of the suite of IEEE 802.11 standards, the Bluetooth standard, or the like.

The peer device 12 includes a music player 22, a recommendation engine 24, and a music collection 26. The music player 22 may be implemented in software, hardware, or a combination of hardware and software. In general, the music player 22 operates to play songs from the music collection 26. The recommendation engine 24 may be implemented in software, hardware, or a combination of hardware and software. The recommendation engine 24 may alternatively be incorporated into the music player 22. The music collection 26 includes any number of song files stored in one or more digital storage units such as, for example, one or more hard-disc drives, one or more memory cards, internal Random-Access Memory (RAM), one or more associated external digital storage devices, or the like.

In operation, each time a song is played by the music player 22, the recommendation engine 24 operates to provide a recommendation identifying the song to the other peer devices 14, 16 via the P2P network. The recommendation does not include the song. In one embodiment, the recommendation may be a recommendation file including information identifying the song. In addition, as discussed below in detail, the recommendation engine 24 operates to programmatically, or automatically, select a next song to be played by the music player 22 based on the recommendations received from the other peer device 14, 16 identifying songs recently played by the other peer devices 14, 16 and user preferences associated with the user of the peer device 12.

Like the peer device 12, the peer device 14 includes a music player 28, a recommendation engine 30, and a music collection 32, and the peer device 16 includes a music player 34, a recommendation engine 36, and a music collection 38.

The subscription music service 18 may be a service hosted by a server connected to the network 20. Exemplary subscription based music services that may be modified to operate according to the present invention are Yahoo! Music Unlimited digital music service and RealNetwork's Rhapsody digital music service.

Figure 2:
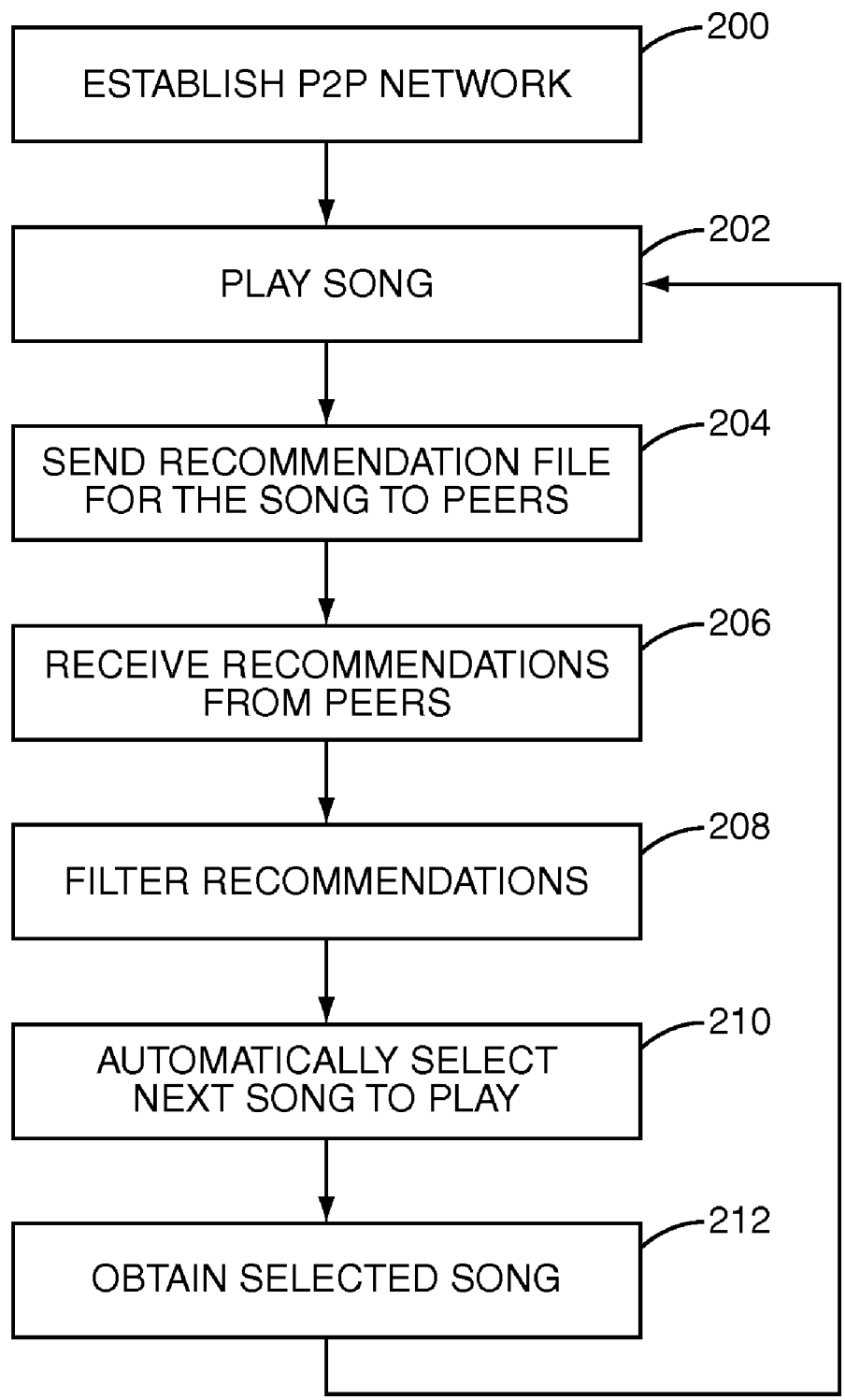
FIG. 2 is a flow chart illustrating the operation of the peer devices of FIG. 1 according to one embodiment of the present invention.

FIG. 2 illustrates the operation of the peer device 12 according to one embodiment of the present invention. However, the following discussion is equally applicable to the other peer devices 14, 16. First, the peer devices 12-16 cooperate to establish a P2P network (step 200). The P2P network may be initiated using, for example, an electronic or verbal invitation. Invitations may be desirable when the user wishes to establish the P2P network with a particular group of other users, such as his or her friends. Note that this may be beneficial when the user desires that the music he or she listens to be influenced only by the songs listened to by, for example, the user's friends. Invitations may also be desirable when the number of peer devices within a local wireless coverage area of the peer device 12 is large. As another example, the peer device 12 may maintain a "buddy list" identifying friends of the user of the peer device 12, where the peer device 12 may automatically establish a P2P network with the peer devices of the users identified by the "buddy list" when the peer devices are within a local wireless coverage area of the peer device 12.

Alternatively, the peer device 12 may establish an ad-hoc P2P network with the other peer devices 14, 16 by detecting the other peer devices 14, 16 within the local wireless coverage area of the peer device 12 and automatically establishing the P2P network with at least a subset of the detected peer devices 14, 16. In order to control the number of peer devices within the ad-hoc P2P network, the peer device 12 may compare user profiles of the users of the other peer devices 14, 16 with a user profile of the user of the peer device 12 and determine whether to permit the other peer devices 14, 16 to enter the P2P network based on the similarities of the user profiles.

At some point after the P2P network is established, the peer device 12 plays a song (step 202). Initially, before any recommendations have been received from the other peer devices 14, 16, the song may be a song from the music collection 26 selected by the user of the peer device 12. Prior to, during, or after playback of the song, the recommendation engine 24 sends a recommendation identifying the song to the other peer devices 14, 16 (step 204). The recommendation may include, but is not limited to, information identifying the song such as a Globally Unique Identifier (GUID) for the song, title of the song, or the like; a Uniform Resource Locator (URL) enabling other peer devices to obtain the song such as a URL enabling download or streaming of the song from the subscription music service 18 or a URL enabling purchase and download of the song from an e-commerce service; a URL enabling download or streaming of a preview of the song from the subscription music service 18 or a similar e-commerce service; metadata describing the song such as ID3 tags including, for example, genre, the title of the song, the artist of the song, the album on which the song can be found, the date of release of the song or album, the lyrics, and the like.

The recommendation may also include a list of recommenders including information identifying each user having previously recommended the song and a timestamp for each recommendation. For example, if the song was originally played at the peer device 14 and then played at the peer device 16 in response to a recommendation from the peer device 14, the list of recommenders may include information identifying the user of the peer device 14 or the peer device 14 and a timestamp identifying a time at which the song was played or recommended by the peer device 14, and information identifying the user of the peer device 16 or the peer device 16 and a timestamp identifying a time at which the song was played or recommended by the peer device 16. Likewise, if the peer device 12 then selects the song for playback, information identifying the user of the peer device 12 or the peer device 12 and a corresponding timestamp may be appended to the list of recommenders.

The peer device 12, and more specifically the recommendation engine 24, also receives recommendations from the other peer devices 14, 16 (step 206). The recommendations from the other peer devices 14, 16 identify songs played by the other peer devices 14, 16. Optionally, the recommendation engine 24 may filter the recommendations from the other peer devices 14, 16 based on, for example, user, genre, artist, title, album, lyrics, date of release, or the like (step 208).

The recommendation engine 24 then automatically selects a next song to play from the songs identified by the recommendations received from the other peer devices 14, 16, optionally songs identified by previously received recommendations, and one or more songs from the music collection 26 based on user preferences (step 210). In one embodiment, the recommendation engine 24 considers only those songs identified by recommendations received since a previous song selection. For example, if the song played in step 202 was a song selected by the recommendation engine 24 based on prior recommendations from the peer devices 14, 16, the recommendation engine 24 may only consider the songs identified in new recommendations received after the song was selected for playback in step 202 and may not consider the songs identified in the prior recommendations. This may be beneficial if the complexity of the recommendation engine 24 is desired to be minimal such as when the peer device 12 is a mobile terminal or the like having limited processing and memory capabilities. In another embodiment, the recommendation engine 24 may consider all previously received recommendations, where the recommendations may expire after a predetermined or user defined period of time.

As discussed below, the user preferences used to select the next song to play may include a weight or priority assigned to each of a number of categories such as user, genre, decade of release, and availability. Generally, availability identifies whether songs are stored locally in the music collection 26; available via the subscription music service 18; available for download, and optionally purchase, from an e-commerce service or one of the other peer devices 14, 16; or are not currently available where the user may search for the songs if desired. The user preferences may be stored locally at the peer device 12 or obtained from a central server via the network 20. If the peer device 12 is a portable device, the user preferences may be configured on an associated user system, such as a personal computer, and transferred to the peer device 12 during a synchronization process. The user preferences may alternatively be automatically provided or suggested by the recommendation engine 24 based on a play history of the peer device 12. In the preferred embodiment discussed below, the songs identified by the recommendations from the other peer devices 14, 16 and the songs from the music collection 26 are scored or ranked based on the user preferences. Then, based on the scores, the recommendation engine 24 selects the next song to play.

Once the next song to play is selected, the peer device 12 obtains the selected song (step 212). If the selected song is part of the music collection 26, the peer device 12 obtains the selected song from the music collection 26. If the selected song is not part of the music collection 26, the recommendation engine 24 obtains the selected song from the subscription music service 18, an e-commerce service, or one of the other peer devices 14, 16. For example, the recommendation for the song may include a URL providing a link to a source from which the song may be obtained, and the peer device 12 may obtain the selected song from the source identified in the recommendation for the song. Once obtained, the selected song is played and the process repeats (steps 202-212).

Figure 3:
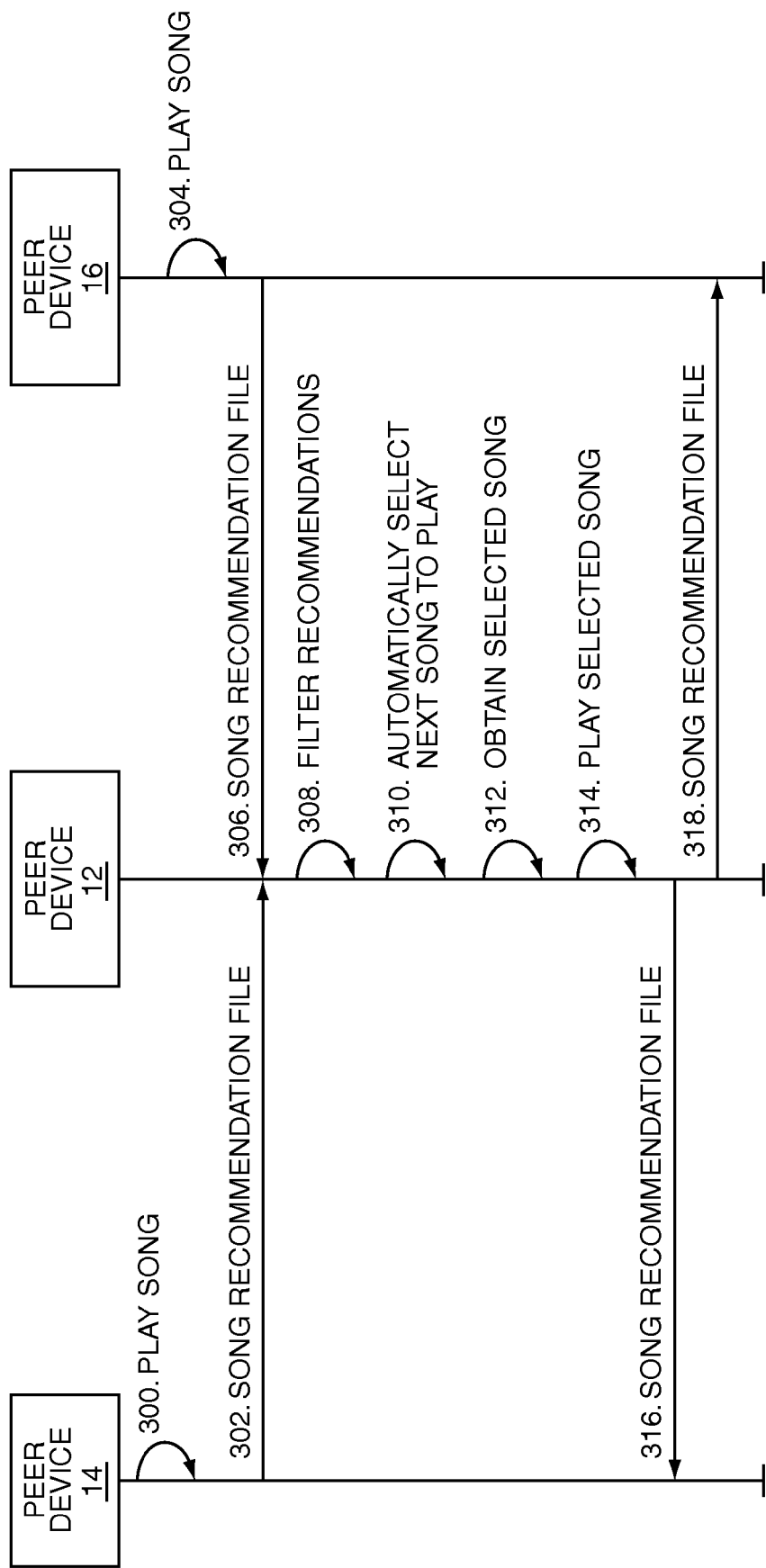
FIG. 3 illustrates the operation of the system of FIG. 1 according to one embodiment of the present invention.

FIG. 3 illustrates the operation of the peer devices 12-16 to provide real time song recommendations according to one embodiment of the present invention. The illustrated process is the same as discussed above with respect to FIG. 2. As such, the details will not be repeated. In general, the peer devices 14, 16 play songs and, in response, provide song recommendations to the peer device 12 (steps 300-306). The peer device 12 may optionally filter the recommendations from the peer devices 14, 16 (step 308). The recommendation engine 24 of the peer device 12 then automatically selects the next song to play from the songs identified by the recommendations, optionally songs identified by prior recommendations from the peer devices 14, 16, and locally stored songs from the music collection 26 based on user preferences of the user of the peer device 12 (step 310). The peer device 12 then obtains and plays the selected song (steps 312-314). Either prior to, during, or after playback of the selected song, the recommendation engine 24 of the peer device 12 provides a recommendation identifying the selected song to the other peer devices 14, 16 (step 316-318).

Figure 4:
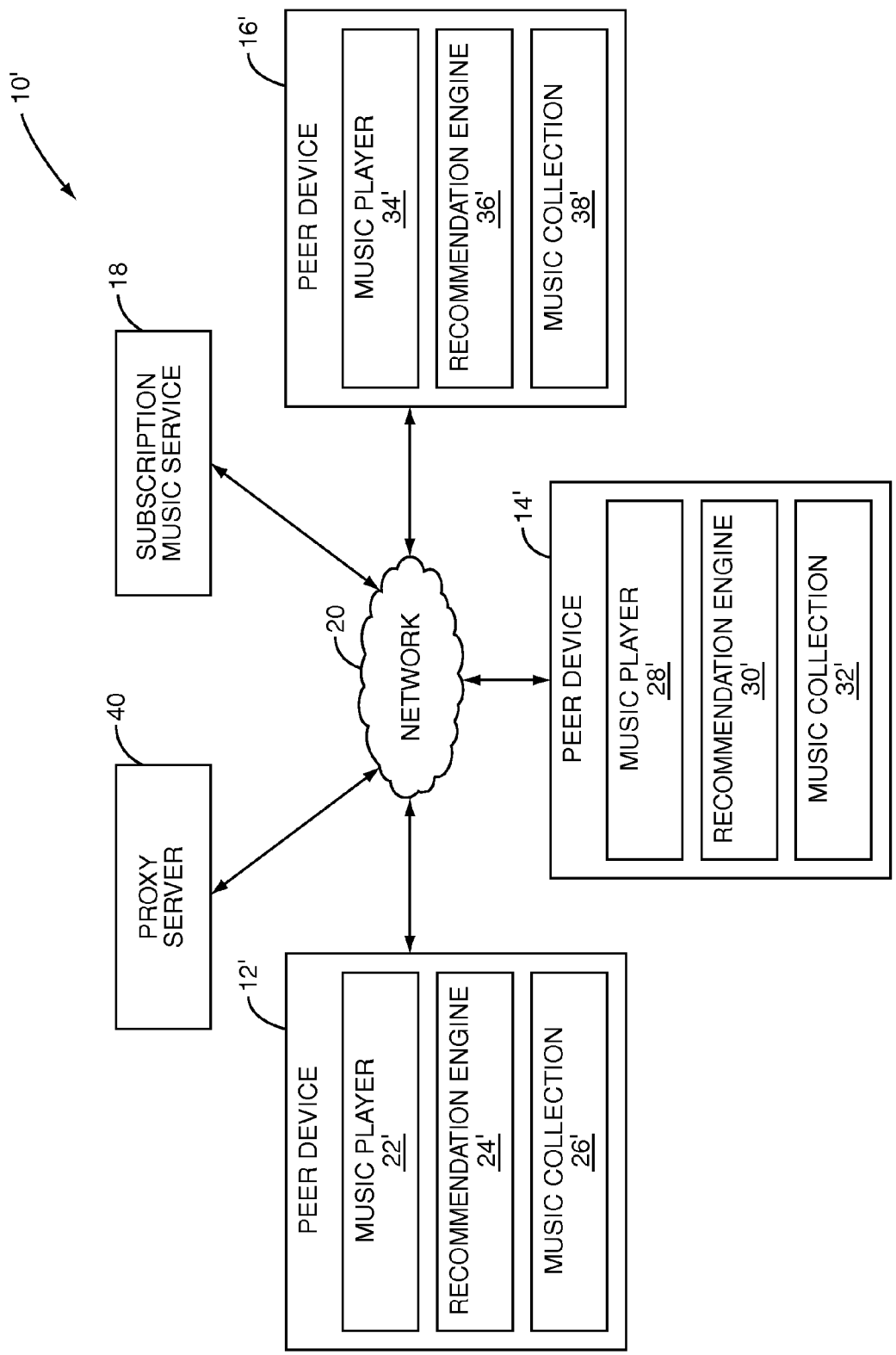
FIG. 4 illustrates a system incorporating a P2P network for real time media recommendations according to a second embodiment of the present invention.

FIG. 4 illustrates the system 10' according to second embodiment of the present invention. In this embodiment, the peer devices 12'-16' form a P2P network via the network 20 and a proxy server 40. The peer devices 12'-16' may be any device having a connection to the network 20 and audio playback capabilities. For example, the peer devices 12'-16' may be personal computers, laptop computers, mobile telephones, portable audio players, PDAs, or the like having either a wired or wireless connection to the network 20. As discussed above with respect to the peer device 12, the peer device 12' includes music player 22', a recommendation engine 24', and a music collection 26'. Likewise, the peer device 14' includes a music player 28', a recommendation engine 30', and a music collection 32', and the peer device 16' includes a music player 34', a recommendation engine 36', and a music collection 38.

Figure 5:
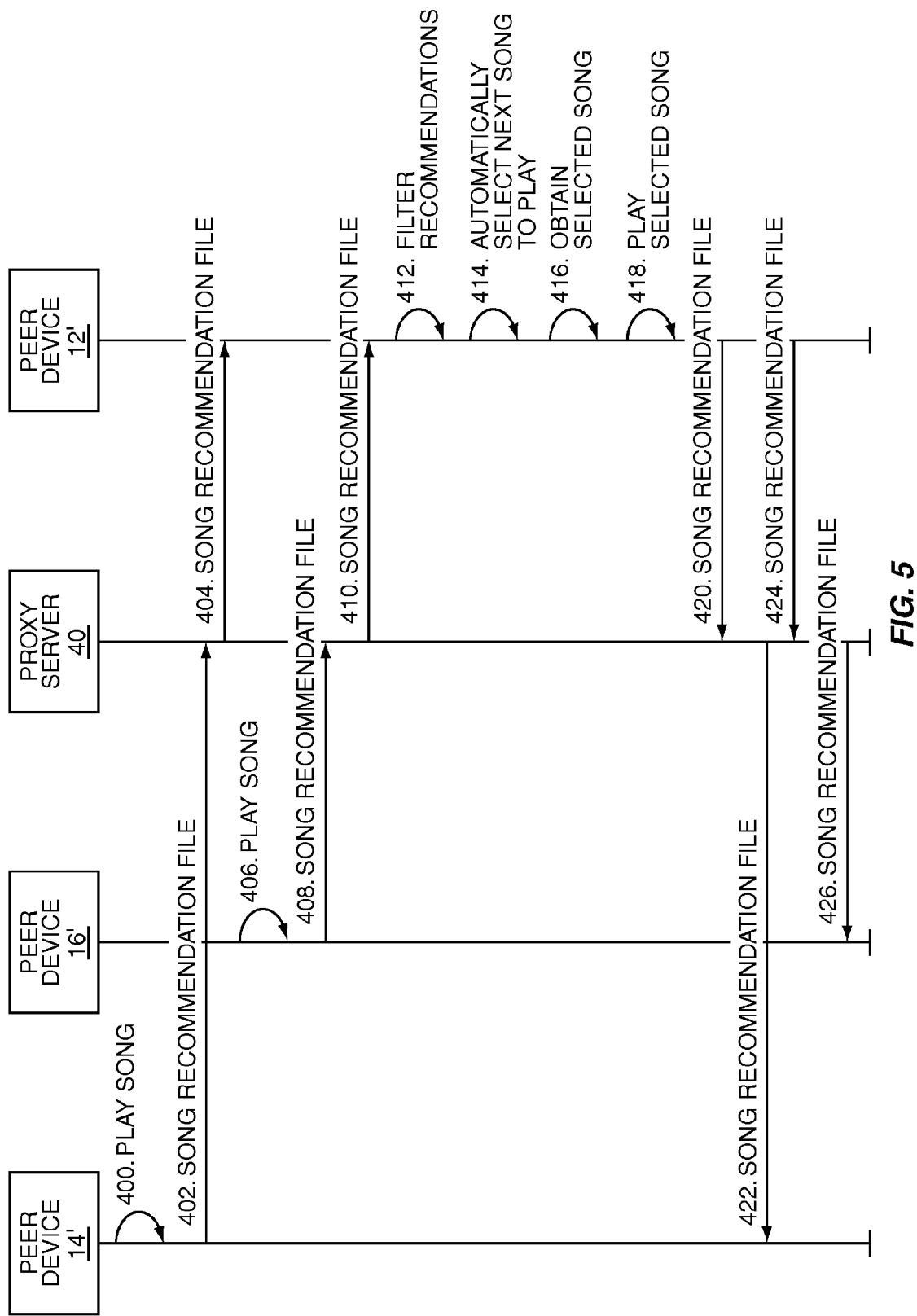
FIG. 5 illustrates the operation of the system of FIG. 4 according to one embodiment of the present invention.

FIG. 5 illustrates the operation of the system 10' of FIG. 4. Prior to beginning the process, the peer devices 12'-16' form a P2P network. Since the number of peer devices 12'-16' that may be connected to the network 20 may be very large, the peer devices 12'-16' may implement some technique for identifying a desired group of peer devices for the P2P network. For example, the P2P network may be initiated using, for example, an electronic or verbal invitation. As another example, the peer device 12' may maintain a "buddy list" identifying friends of the user of the peer device 12', where the peer device 12' may automatically establish a P2P network with the peer devices of the users identified by the "buddy list" when the peer devices are connected to the network 20. Alternatively, the peer devices 12'-16' may form an ad-hoc network where the participants for the ad-hoc network are selected based on similarities in user profiles.

In this example, once the P2P network is established, the peer device 14' plays a song and, in response, provides a song recommendation identifying the song to the peer device 12' via the proxy server 40 (steps 400-404). While not illustrated for clarity, the peer device 14' also sends the recommendation for the song to the peer device 16' via the proxy server 40. The peer device 16' also plays a song and sends a song recommendation to the peer device 12' via the proxy server 40 (steps 406-410). Again, while not illustrated for clarity, the peer device 16' also sends the recommendation for the song to the peer device 14' via the proxy server 40.

From this point, the process continues as discussed above. More specifically, the recommendation engine 24' may optionally filter the recommendations from the other peer devices 14', 16' based on, for example, user, genre, artist, title, album, lyrics, date of release, or the like (step 412). The recommendation engine 24' then automatically selects a next song to play from the songs identified by the recommendations received from the other peer devices 14'-16', optionally songs identified by previously received recommendations from the peer devices 14'-16', and one or more songs from the music collection 26' based on user preferences (step 414). In the preferred embodiment discussed below, the songs identified by the recommendations from the other peer devices 14'-16' and the songs from the music collection 26' are scored based on the user preferences. Then, based on the scores, the recommendation engine 24' selects the next song to play.

Once the next song to play is selected, the peer device 12' obtains the selected song (step 416). If the selected song is part of the music collection 26', the peer device 12' obtains the selected song from the music collection 26'. If the selected song is not part of the music collection 26', the recommendation engine 24' obtains the selected song from the subscription music service 18, an e-commerce service, or one of the other peer devices 14'-16'. For example, the selected song may be obtained from a source identified in the recommendation for the song. Once obtained, the selected song is played and a recommendation for the song is provided to the other peer devices 14'-16' via the proxy server 40 (steps 418-426).

Figure 6:
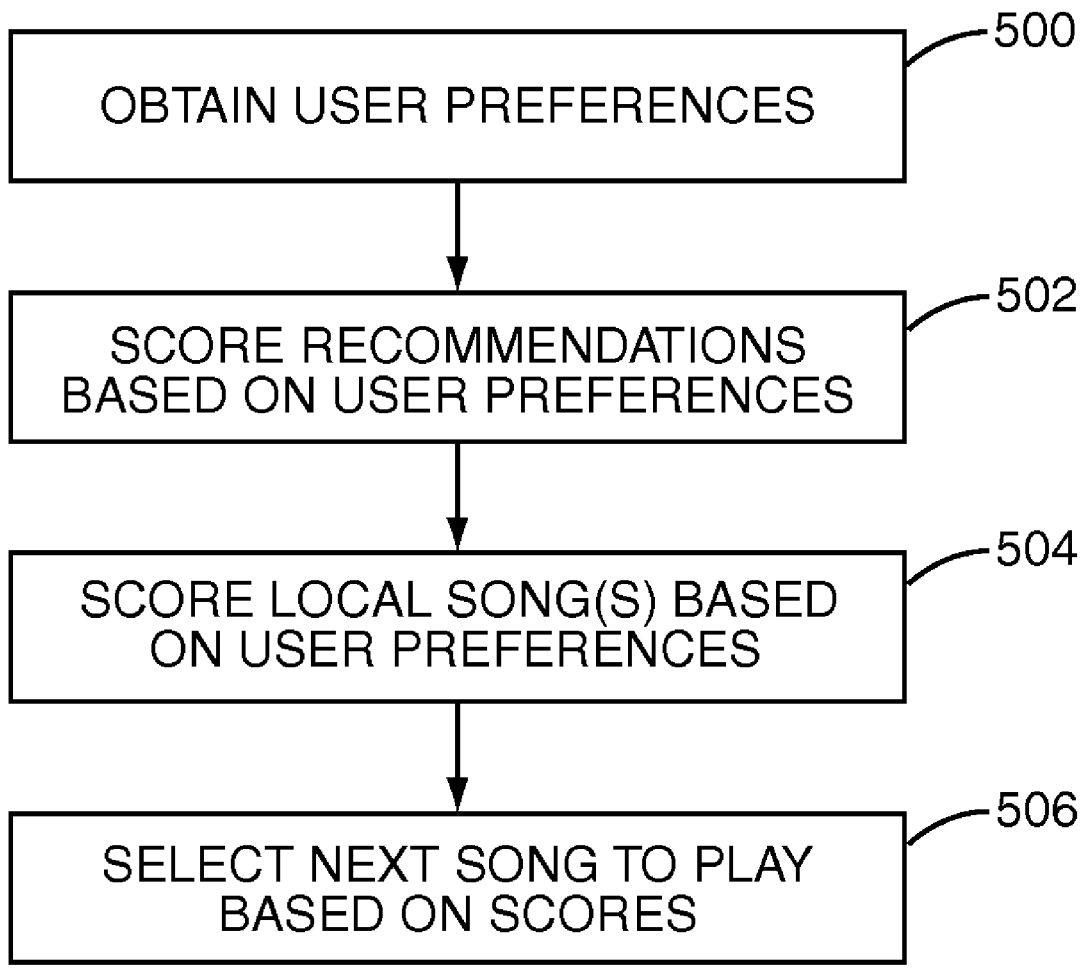
FIG. 6 is a flow chart illustrating a method for automatically selecting media to play based on recommendations from peer devices and user preferences according to one embodiment of the present invention.

FIG. 6 illustrates the process of automatically selecting a song to play from the received recommendations and locally stored songs at the peer device 12' according to one embodiment of the present invention. However, the following discussion is equally applicable to the peer devices 12-16 of FIG. 1, as well as the other peer devices 14'-16' of FIG. 4. First, the user preferences for the user of the peer device 12' are obtained (step 500). The user preferences may include a weight or priority assigned to each of a number of categories such as, but not limited to, user, genre, decade of release, and availability. The user preferences may be obtained from the user during an initial configuration of the recommendation engine 24'. In addition, the user preferences may be updated by the user as desired. The user preferences may alternatively be suggested by the recommendation engine 24' or the proxy server 40 based on a play history of the peer device 12'. Note that that proxy server 40 may ascertain the play history of the peer device 12' by monitoring the recommendations from the peer device 12' as the recommendations pass through the proxy server 40 on their way to the other peer devices 14'-16'. The user preferences may be stored locally at the peer device 12' or obtained from a central server, such as the proxy server 40, via the network 20.

Once recommendations are received from the other peer devices 14'-16', the recommendation engine 24' of the peer device 12' scores the songs identified by the recommendations based on the user preferences (step 502). The recommendation engine 24' also scores one or more local songs from the music collection 26' (step 504). The recommendation engine 24' then selects the next song to play based, at least on part, on the scores of the recommended and local songs (step 506).

Figure 7:
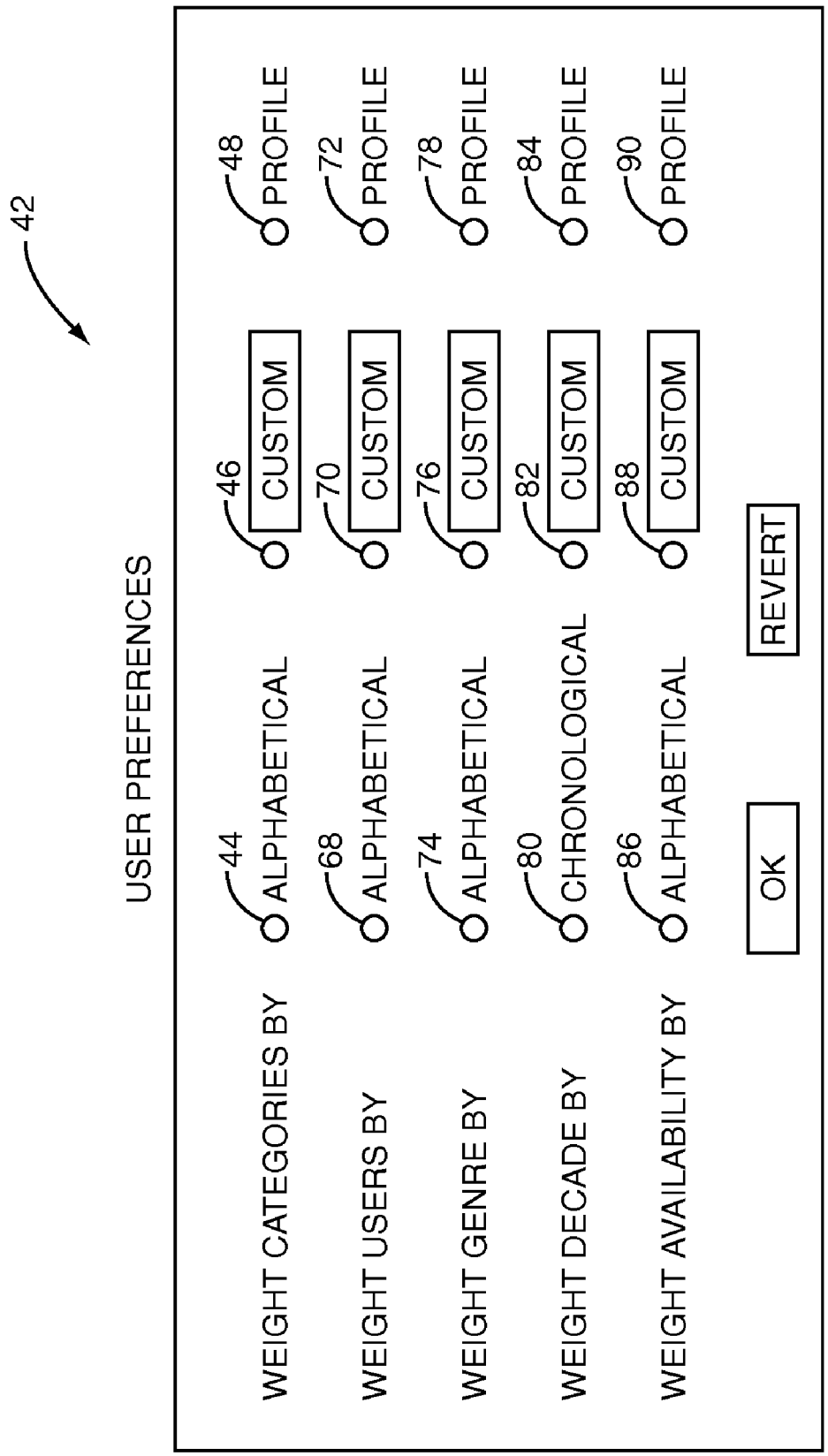
FIG. 7 illustrates an exemplary graphical user interface (GUI) for configuring user preferences according to one embodiment of the present invention.
Figure 8:
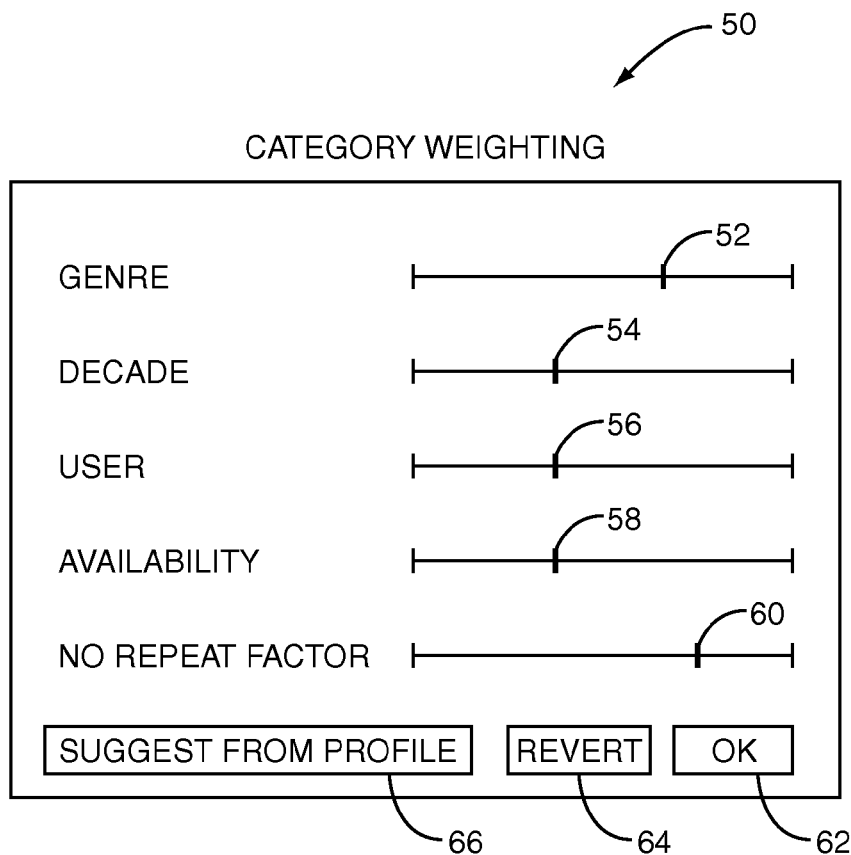
FIG. 8 illustrates an exemplary GUI for assigning weights to various categories of media content as part of configuring the user preferences according to one embodiment of the present invention.

FIG. 7 illustrates an exemplary graphical user interface (GUI) 42 for configuring user preferences using a plurality of selectors. First, the user assigns a weight to various categories. In this example, the categories are users, genre, decade, and availability. However, the present invention is not limited thereto. The weights for the categories may be assigned alphabetically by selecting radio button 44, customized by the user by selecting radio button 46, or automatically suggested based on a user profile of the user by selecting radio button 48. If alphabetical weighting is selected, the weights are assigned by alphabetically sorting the categories and assigning a weight to each of the categories based on its position in the alphabetically sorted list of categories. As illustrated in FIG. 8, if customized weighting is selected, the user may be presented with a GUI 50 for customizing the weighting of the categories. As illustrated in the exemplary embodiment of FIG. 8, the weights of the categories may be assigned by adjusting corresponding sliding bars 52-58. Sliding bar 60 may be adjusted to assign a weight to a "no repeat factor." The no repeat factor is a dampening factor used to alter a song's score based on when the song was previously played at the peer device 12' in order to prevent the same song from being continually repeated.

Once the weights are assigned, the user may select an OK button 62 to return to the GUI 42 of FIG. 7 or select a REVERT button 64 to return the weights of the categories to their previous settings. In addition, the user may select a SUGGEST FROM PROFILE button 66 to have the recommendation engine 24' or the proxy server 40 suggest weights for the categories based on a user profile. Note that the button 66 has the same effect as the radio button 48 of FIG. 7.

Returning to FIG. 7, radio buttons 68-72 are used to select a desired method for assigning weights to each user in the P2P network, radio buttons 74-78 are used to select a desired method for assigning weights to each of a number of genres of music, radio buttons 80-84 are used to select the desired method for assigning weights to each of a number of decades, and radio buttons 86-90 are used to select the desired method for assigning weights to a number of song availability types.

Figure 9:
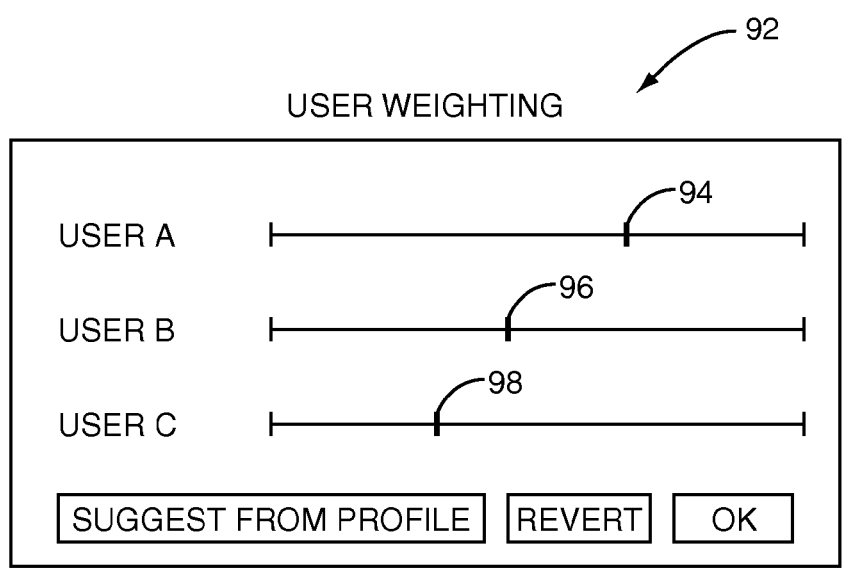
FIG. 9 illustrates an exemplary GUI for assigning weights to individual users within a user category as part of configuring the user preferences according to one embodiment of the present invention.

Regarding users, if the radio button 68 is selected, the users are assigned weights based on their respective positions in an alphabetically sorted list of users. If the radio button 70 is selected, a GUI 92 (FIG. 9) enabling the user to customize the weights assigned to a number of users from which recommendations are received. An exemplary embodiment of the GUI 92 is illustrated in FIG. 9, where sliding bars 94-98 enable the user to assign customized weights to corresponding users. Returning to FIG. 7, if the radio button 72 is selected, the recommendation engine 24' or the proxy server 40 generates suggested weights for the users based on a user profile associated with the peer device 12'.

Figure 10:
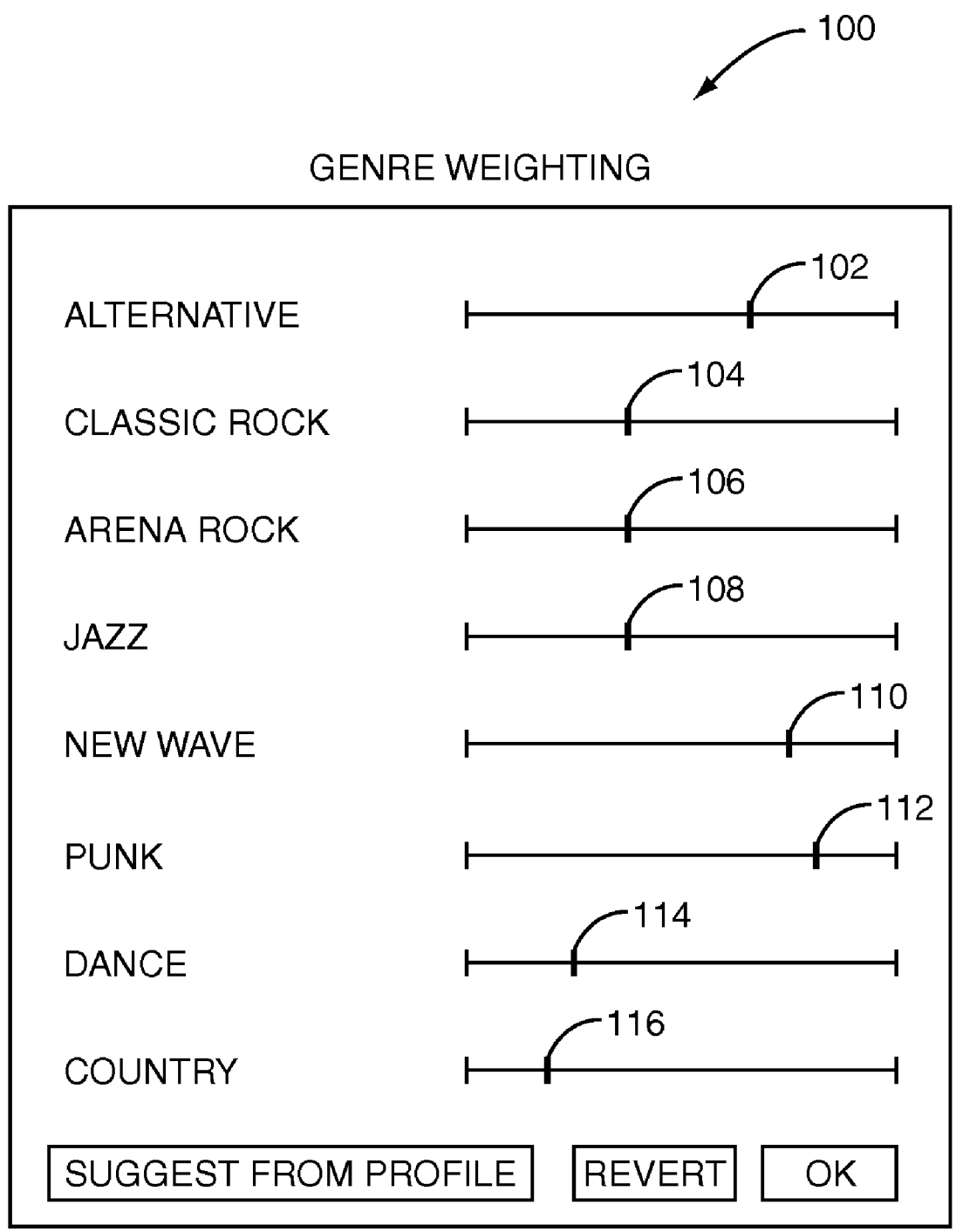
FIG. 10 illustrates an exemplary GUI for assigning weights to individual genres from a genre category as part of configuring the user preferences according to one embodiment of the present invention.

Regarding genres, if the radio button 74 is selected, the genres are assigned weights based on their respective positions in an alphabetically sorted list of genres. If the radio button 76 is selected, a GUI 100 (FIG. 10) enabling the user to customize the weights assigned to a number of genres. An exemplary embodiment of the GUI 100 is illustrated in FIG. 10, where sliding bars 102-116 enable the user to assign customized weights to corresponding genres. Returning to FIG. 7, if the radio button 78 is selected, the recommendation engine 24' or the proxy server 40 generates suggested weights for the genres based on a user profile associated with the peer device 12'.

Figure 11:
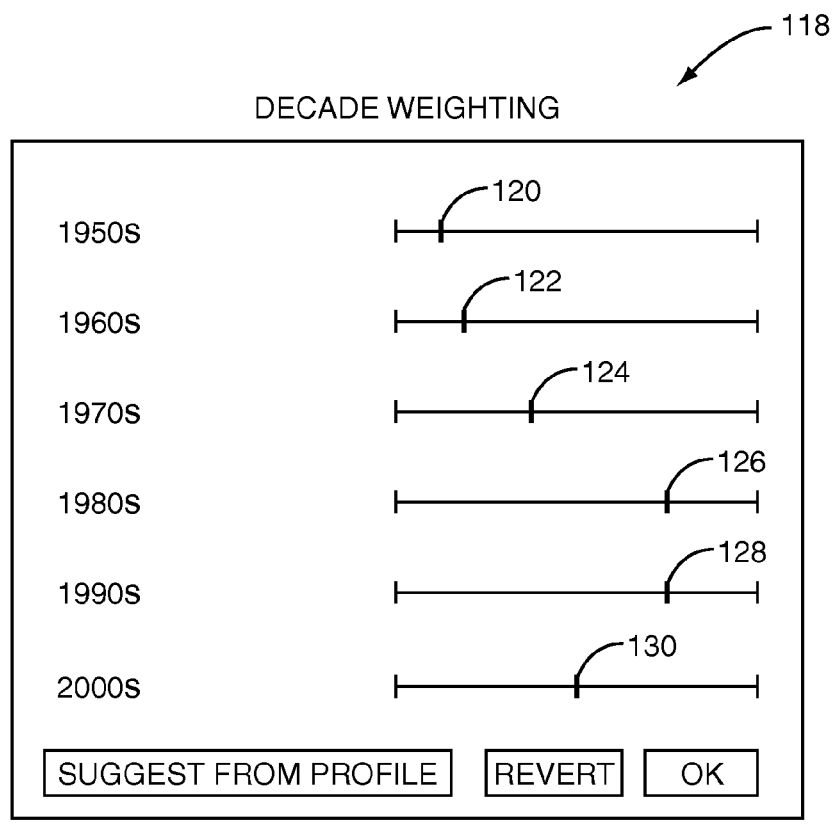
FIG. 11 illustrates an exemplary GUI for assigning weights to individual decades from a decade category as part of configuring the user preferences according to one embodiment of the present invention.

Regarding decades, if the radio button 80 is selected, the decades are assigned weights based on their respective positions in a chronologically sorted list of decades. If the radio button 82 is selected, a GUI 118 (FIG. 11) enabling the user to customize the weights assigned to a number of decades. An exemplary embodiment of the GUI 118 is illustrated in FIG. 11, where sliding bars 120-130 enable the user to assign customized weights to corresponding decades. Returning to FIG. 7, if the radio button 84 is selected, the recommendation engine 24' or the proxy server 40 generates suggested weights for the decades based on a user profile associated with the peer device 12'.

Figure 12:
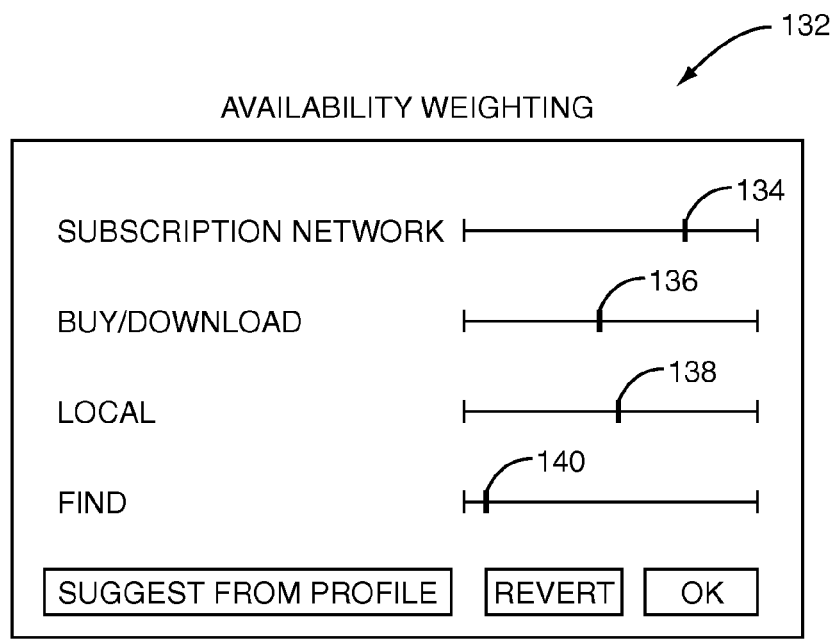
FIG. 12 illustrates an exemplary GUI for assigning weights to individual availability types from an availability type category as part of configuring the user preferences according to one embodiment of the present invention.

Regarding availability, if the radio button 86 is selected, the availability types are assigned weights based on their respective positions in an alphabetically sorted list of availability types. If the radio button 88 is selected, a GUI 132 (FIG. 12) enabling the user to customize the weights assigned to a number of availability types. An exemplary embodiment of the GUI 132 is illustrated in FIG. 12, where sliding bars 134-140 enable the user to assign customized weights to corresponding availability types. Returning to FIG. 7, if the radio button 90 is selected, the recommendation engine 24' or the proxy server 40 generates suggested weights for the availability types based on a user profile associated with the peer device 12'.

An exemplary equation for scoring a particular song is:

Score=NRF·(WU·WUA+WG·WGA+WD·WDA+ WA·WAA)·100, where NRF is the "no repeat factor"; WU is the weight assigned to the user category; WUA is the weight assigned to the user attribute of the song, which is the user recommending the song; WG is the weight assigned to the genre category; WGA is the weight assigned to the genre attribute of the song, which is the genre of the song; WD is the weight assigned to the decade category; WDA is the weight assigned to the decade attribute of the song, which is the decade in which the song or the album associated with the song was released; WA is the weight assigned to the availability category; and WAA is the weight assigned to the availability attribute of the song, which is the availability of the song.

The NRF may, for example, be computed as:

$$NRF = \frac{MIN(10 \cdot NRFW, LASTREPEAT\_INDEX)}{10 \cdot NRFW}.$$

As an example, assume that the following category weights have been assigned:

| | |
|---|---|
| User Category | 1 |
| Genre Category | 7 |
| Decade Category | 7 |
| Availability Type Category | 5 |
| NRFW | 9 |

Further assume that the attributes for the categories have been assigned weights as follows:

| User | | Genre | | Decade | | Availability | |
|---|---|---|---|---|---|---|---|
| User A | 5 | Alternative | 8 | 1950s | 2 | Local | 8 |
| User B | 5 | Classic Rock | 5 | 1960s | 4 | Subscription Network | 2 |
| User C | 5 | Arena Rock | 5 | 1970s | 7 | Buy/Download | 1 |
| | | Jazz | 5 | 1980s | 9 | Find | 1 |
| | | New Wave | 2 | 1990s | 5 | | |
| | | Punk | 4 | 2000s | 5 | | |
| | | Dance | 2 | | | | |
| | | Country | 2 | | | | |

Thus, if a particular song to be scored is recommended by the user "User C," is from the "Alternative Genre," is from the "1980s" decade, and is available from the subscription music service 18, the score of the song may be computed as:

$$Score = NRF \cdot \left(\frac{1}{20} \cdot \frac{5}{10} + \frac{7}{20} \cdot \frac{8}{10} + \frac{7}{20} \cdot \frac{9}{10} + \frac{5}{20} \cdot \frac{2}{10}\right) \cdot 100$$

where if the song was last played 88 songs ago, $$NRF = \frac{MIN(10 \cdot 9, 88)}{10 \cdot 9} = \frac{88}{90}.$$

Thus, the score for the song is $$Score = \frac{88}{90} \cdot \left(\frac{1}{20} \cdot \frac{5}{10} + \frac{7}{20} \cdot \frac{8}{10} + \frac{7}{20} \cdot \frac{9}{10} + \frac{5}{20} \cdot \frac{2}{10}\right) \cdot 100 = 65.5.$$

The present invention provides GUIs to allow the user to navigate through and sort his or her media item collection containing the media item recommendations based on a preference scoring system described above.

FIG. 13 is an exemplary GUI 142 showing a playlist for the peer device 12' including both local and recommended songs according to the present invention. However, note that a similar list may be maintained internally by the peer device 12 of FIG. 1 and potentially optimized to display at least a portion of the GUI 142 on the display of the peer device 12. In this example, both the local and recommended songs are scored, as described above, and sorted according to their scores. In addition, as illustrated in FIG. 14, the songs may be sorted based on another criterion, which in the illustrated example is genre, and score.

The GUI 142 may optionally allow the user to block songs having particular identified fields. In the examples of FIGS. 13 and 14, the user has identified the genre "country" and the artist "iron maiden" as fields to be blocked, as illustrated by the underlining. The user may select fields to block by, for example, clicking on or otherwise selecting the desired fields. Songs having the blocked fields are still scored but are not obtained or played by the peer device 12'.

Referring to FIGS. 13 and 14, in one embodiment, the GUI 142 may display the identity of the user 163 of the peer device 12' in the upper right corner. The playlist on the GUI 142 may be displayed utilizing one column or a plurality of columns of information concerning the media items on the playlist. FIGS. 13 and 14 show eight columns 164-178, each column having a descriptive heading for the information displayed in the column. The GUI 142 includes a user column 164, a song column 166, an artist column 168, a genre column 170, a decade column 172, a time column 174, an availability column 176, and a score column 178. The information in the columns may be organized in rows with the information in each row aligned to the related media items displayed in the song column 166.

The user column 164 displays a list of users who have subscribed to the client application. The users displayed in the user column 164 may be the user and/or peers or friends of the user. Individual users may appear more than once in the user column 164 based on the number of recommendations from the user, with respect to the peers or friends of the user, and/or based on the number of media items stored locally in peer device 12', with respect to the user. The song column 166 is a list of media item titles for the media items recommended by the users and the media items stored locally in peer device 12'. Although the song column 166 in FIGS. 13 and 14 lists songs, it should be understood that any media items, such as movies and television shows, may be listed, and the present invention should not be limited to just songs. Optionally, the song column 166 may also be referred to and have a descriptive heading of "Title" column. Also, the media items that are stored locally in peer device 12' are interleaved with the media items that are recommendations from a friend or peer of the user.

The artist column 168 displays a list of the names of the artists associated with the particular media item. The genre column 170 displays a list of the genre categories in which the media items may be defined. The decade column 172 displays a list of the beginning year of the decade in which the media item was released. Optionally, the decade column 172 may be a "Year" column with the actual year of the release of the media item displayed. The time column 174 displays the time since that particular media item was played by the associated user in the user column 164. The availability column 176 comprises information regarding the location of the media items, as discussed above. The score column 178 displays the score for the associated media item, which may be determined using the user preference information as discussed in detail above.

The media items displayed in the song column 166 are sorted in an order depending on the media item's score, which is displayed in the score column 178 from the highest score to the lowest score. FIG. 13 shows "Sweet Emotion" positioned first in the score column 178 with the highest score of "95" and "Something More" positioned last in score column 178 with the lowest score of "25." Optionally, the user may elect to have the scores displayed in the score column 178 in reverse order, having the lowest score displayed at the top and the highest score displayed at the bottom. The user may elect to have the scores displayed in reverse order by clicking on the descriptive heading of the score column 178. If a new recommendation is received by the peer device 12' and/or a new media item is stored locally in the peer device 12', the playlist is re-sorted, if necessary, to maintain the order based on the score.

The user may sort the playlist based on several different criteria. The sorting criteria may include, for example, user, title, artist, genre, year of release, and availability. The user may sort the playlist according to the criterion by selecting the column associated with the criterion. The user may select the column for sorting by clicking on the descriptive header for that column. For example, if the user elects to sort the playlist by title, the user may click on the descriptive heading for the song column 166, and the media items displayed on the playlist are displayed in an order based on an alphabetical listing of the titles of the media items. If the user selects the artist column 168, the media items are displayed in an order based on an alphabetical listing of the artists. If an artist has more than one media item on the playlist, the media items for that artist are displayed according to the media item score in descending order.

If the user selects another column, for example, the genre column 170, the media items in the playlist are sorted according to genre in a descending order with the media items defined as being in the user's most preferred genre category positioned at the top of the displayed playlist, and the media items defined as being in the user's least preferred genre category at the bottom of the displayed playlist. If there is more than one media item within a genre, the media items within the genre are sorted by the media item's score in descending order.

An example of the playlist sorted by the genre criterion is shown in FIG. 14. The media items are shown sorted according to genre categories according to score. An alternative genre 180 is shown as the most preferred and a country genre 182 is shown as the least preferred with media items positioned in an order within each particular genre category based on the score. For example, in the alternative genre 180 category, four media items are listed in descending order according to their score. "Dance In my Sleep" with a score of "92" is displayed first in the alternative genre 180 category and "Alison" with a score of "65" is displayed last in the 'alternative' genre 180 category, which is the fourth position on the playlist. The playlist may be similarly sorted based on any of the columns 164-176 by clicking on the descriptive header for that column. By selecting the score column 178 again, the genre sorting criterion is removed and the playlist is sorted according to score as shown on FIG. 13.

The media items may be displayed on the playlist in the order in which the media items are played. A play order of the media items depends on and follows the order in which the media items are positioned on the playlist. For example, in FIG. 13, "Sweet Emotion" is positioned first on the playlist and, therefore, is played first with the other songs played in the order they are positioned in the song column. The media item in the last position, "Something More," is played last. Similarly, in FIG. 14, "Dance In my Sleep," the media item in the first position, is played first and "Something More" is played last. If the user changes the sorting of the playlist, as discussed above, the play order of the media items also changes to follow the manner in which the media items are positioned on the playlist based on the changed sorting. Also, as discussed above, if a new recommendation is received by the peer device 12' and/or a new media item is stored locally in the peer device 12', the playlist is re-sorted, if necessary, to maintain the order based on the score and the user's sorting criterion, and, therefore, the play order may also change.

Figure 15:
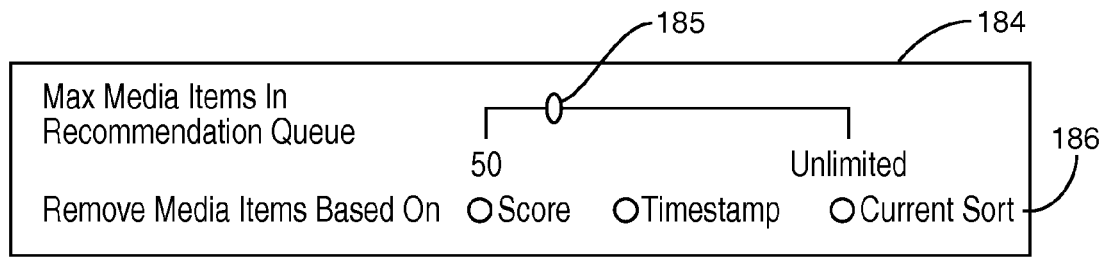
FIG. 15 illustrates an exemplary GUI for selecting the maximum number of media items in a recommendation queue according to one embodiment of the present invention.
Figure 17:
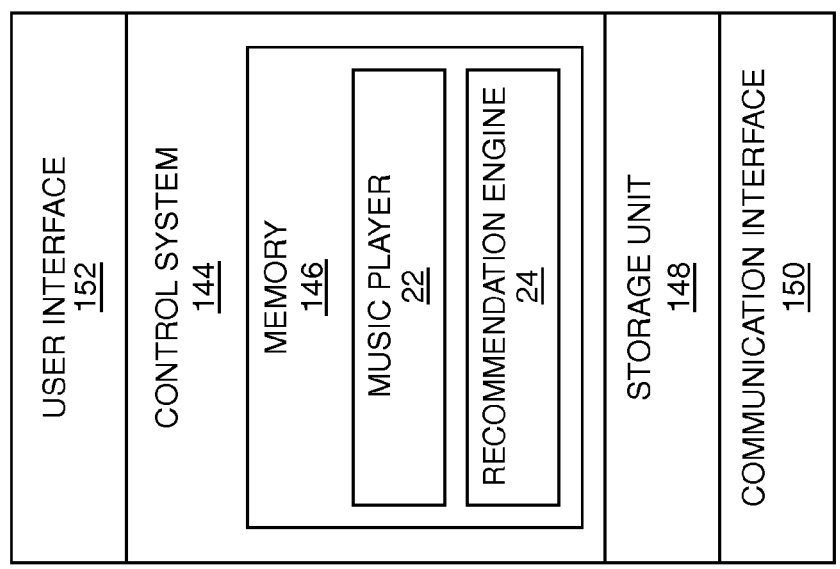
FIG. 17 is a block diagram of a peer device of FIG. 1 according to one embodiment of the present invention.

In one embodiment, the user may choose the number of recommendations that are displayed on the playlist. The user may do this by setting the maximum number of recommendations in a recommendation queue. FIG. 15 illustrates a GUI 184 with a selector 185. The selector may be a sliding bar 185. The user may select the maximum number of recommendations in the queue by positioning the "Max Media Items in Recommendation Queue" sliding bar 185. For purposes of describing the present invention, FIG. 17 illustrates a range of settings for the "Max Media Items in Recommendation Queue" sliding bar 185 of "50" to "unlimited." However, it is understood that any number of recommendations may be selected and the present invention should not be limited to the numbers illustrated on FIG. 15.

Optionally, the GUI 184 may include a "Remove Media Items Based On" plurality of selectors 186. The "Remove Media Items Based On" selector 186 allows the user to select the basis on which recommendations are removed from the playlist. FIG. 15 illustrates three bases on which to remove recommendations: by "Score," by "Timestamp," and by "Current Sort." If the user selects "Score," the number of recommendations selected with the highest scores are retained and other recommendations are removed from the playlist. For example, if the user sets the "Max Media Items in Recommendation Queue" sliding bar 185 to "50," the fifty recommendations with the best score are retained and the rest of the recommendations are removed from the playlist. Similarly, with respect to this example, if the user selects "Timestamp," the fifty newest received recommendations are retained and the recommendations that have been on the playlist longer are removed. Also, if the user selects "Current Sort," the fifty recommendations based on the user's selected sorting criterion are retained and the rest of the recommendations are removed.

In one embodiment, the recommendation engine 24' of the peer device 12' may provide a download queue containing all songs to be downloaded, and optionally purchased, from an external source such as the subscription music service 18, an e-commerce service, or another peer device 14'-16'. Songs in the download queue having scores above a first predetermined or user defined threshold and previews of other songs in the download queue having scores above a second predetermined or user defined threshold but below the first threshold may be automatically downloaded to the peer device 12'.

Figure 16:
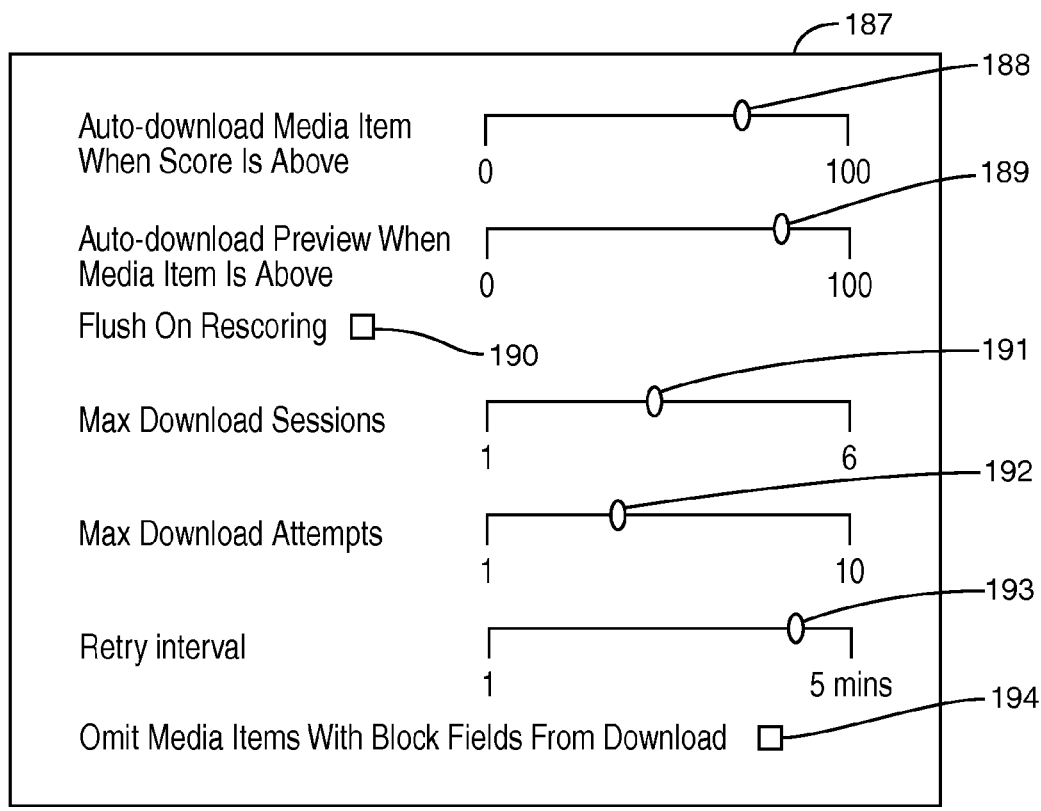
FIG. 16 illustrates an exemplary GUI for providing user-defined thresholds for a media item download queue according to one embodiment of the present invention.

FIG. 16 illustrates an exemplary GUI 187 for the user to provide user-defined thresholds for the download queue. The GUI 187 provides a plurality of selectors, which may be sliding bars, for the user to use to establish the thresholds utilizing an "Auto-download Media Item When Score Is Above" sliding bar 188 and "Auto-download Preview When Media Item Is Above" sliding bar 189. The user selects the threshold value by manipulating one or both of the sliding bars.

Also included on the GUI 187 may be a "Flush On Rescoring" selector 190, a "Max Download Sessions" sliding bar 191, a "Max Download Attempts" sliding bar 192, a "Retry Interval" sliding bar 193, and an "Omit Media Items With Block Fields From Download" selector 194. If the user actuates the "Flush On Rescoring" selector 190, the songs are deleted from the download queue if the user re-sorts the playlist based on a criterion. The "Max Download Sessions" sliding bar 191 allows the user to select the maximum number of sockets for downloading songs to the peer device 12'. The "Max Download Attempts" sliding bar 192 and the "Retry Interval" sliding bar 193 allow the user to control the number of retry attempts to download songs and the time interval between the retry attempts, respectively. The "Omit Media Items With Block Fields From Download" selector 194 allows the user to designate media items on the media item playlist to be omitted from the download queue as discussed in detail above.

FIG. 17 is a block diagram of an exemplary embodiment of the peer device 12 of FIG. 1. However, the following discussion is equally applicable to the other peer devices 14, 16. In general, the peer device 12 includes a control system 144 having associated memory 146. In this example, the music player 22 and the recommendation engine 24 are at least partially implemented in software and stored in the memory 146. The peer device 12 also includes a storage unit 148 operating to store the music collection 26 (FIG. 1). The storage unit 148 may be any number of digital storage devices such as, for example, one or more hard-disc drives, one or more memory cards, RAM, one or more external digital storage devices, or the like. The music collection 26 may alternatively be stored in the memory 146. The peer device 12 also includes a communication interface 150. The communication interface 150 includes a local wireless communication interface for establishing the P2P network with the other peer devices 14, 16. The local wireless interface may operate according to, for example, one of the suite of IEEE 802.11 standards, the Bluetooth standard, or the like. The communication interface 150 may also include a network interface communicatively coupling the peer device 12 to the network 20 (FIG. 1). The peer device 12 also includes a user interface 152, which may include components such as a display, speakers, a user input device, and the like.

Figure 18:
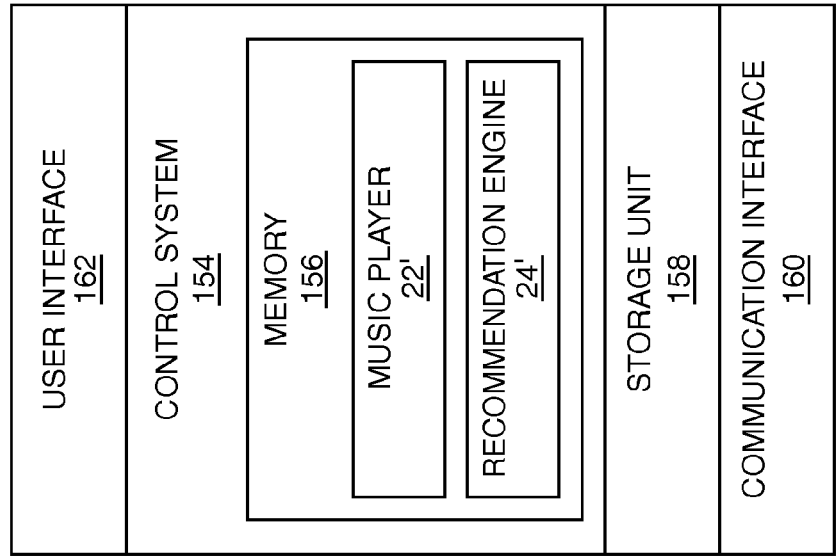
FIG. 18 is a block diagram of a peer device of FIG. 4 according to one embodiment of the present invention.

FIG. 18 is a block diagram of an exemplary embodiment of the peer device 12' of FIG. 4. However, the following discussion is equally applicable to the other peer devices 14'-16'. In general, the peer device 12' includes a control system 154 having associated memory 156. In this example, the music player 22' and the recommendation engine 24' are at least partially implemented in software and stored in the memory 156. The peer device 12' also includes a storage unit 158 operating to store the music collection 26' (FIG. 4). The storage unit 158 may be any number of digital storage devices such as, for example, one or more hard-disc drives, one or more memory cards, RAM, one or more external digital storage devices, or the like. The music collection 26' may alternatively be stored in the memory 156. The peer device 12' also includes a communication interface 160. The communication interface 160 includes a network interface communicatively coupling the peer device 12' to the network 20 (FIG. 4). The peer device 12' also includes a user interface 162, which may include components such as a display, speakers, a user input device, and the like.

The present invention provides substantial opportunity for variation without departing from the spirit or scope of the present invention. For example, while FIG. 1 illustrates the peer devices 12-16 forming the P2P network via local wireless communication and FIG. 4 illustrates the peer devices 12'-16' forming the P2P network via the network 20, the present invention is not limited to either a local wireless P2P network or a WAN P2P network in the alternative. More specifically, a particular peer device, such as the peer device 12, may form a P2P network with other peer devices using both local wireless communication and the network 20. Thus, for example, the peer device 12 may receive recommendations from both the peer devices 14, 16 (FIG. 1) via local wireless communication and from the peer devices 14'-16' (FIG. 4) via the network 20.

As another example, while the discussion herein focuses on song recommendations, the present invention is not limited thereto. The present invention is equally applicable to recommendations for other types of media presentations such as video presentations. Thus, the present invention may additionally or alternatively provide movie recommendations, television program recommendations, or the like.

Those skilled in the art will recognize improvements and modifications to the preferred embodiments of the present invention. All such improvements and modifications are considered within the scope of the concepts disclosed herein and the claims that follow.

What is claimed is:

1. A non-transitory computer readable medium storing software for instructing a microprocessor-based device to generate a user interface of a client application, the user interface comprising:

a media item playlist for managing media items, the media item playlist comprising a plurality of columns of information associated with the media items, the plurality of columns of information comprising:

a user column comprising a list of users subscribed to the client application;

a title column comprising a plurality of different media item titles associated with the media items, wherein the media items include a locally stored media item and at least one recommended media item automatically included with the media items in response to a media item recommendation from at least one of the users; and a score column comprising a score for the media items, wherein the score is determined by applying one or more user-defined preferences to the plurality of media items, and wherein the plurality of different media item titles is displayed based on at least the score and a sorting criterion; and a plurality of selectors comprising:

an auto-download media item selector operable to establish a first threshold score, wherein the media item with the score based on the one or more user-defined preferences that is at least as high as the first threshold score is automatically downloaded; and an auto-download preview selector operable to establish a second threshold score, wherein a preview of the media item with the score based on the one or more user-defined preferences that is at least as high as the second threshold score and less than the first threshold score is automatically downloaded.

2. The non-transitory computer readable medium of claim 1, wherein the at least one recommended media item comprises one of the media items played during a defined period of time.

3. The non-transitory computer readable medium of claim 1, wherein the at least one recommended media item is limited to an established number of the media items.

4. The non-transitory computer readable medium of claim 1, wherein the media items play in a play order based on an order in which the plurality of different media item titles are positioned on the media item playlist.

5. The non-transitory computer readable medium of claim 4, wherein the play order changes if the order in which the plurality of different media item titles displayed changes.

6. The non-transitory computer readable medium of claim 1, further comprising:
  an artist column comprising at least one artist associated with one of the media items;
  a genre column comprising at least one genre category associated with one of the media items;
  a decade column comprising a beginning year of a decade, wherein a date of release of the one of the media items occurred within the decade; and
  an availability column comprising information regarding a location of one of the media items.

7. The non-transitory computer readable medium of claim 6, wherein the sorting criterion is associated with one of the plurality of columns and the media item playlist is sorted by selecting the associated one of the plurality of columns.

8. The non-transitory computer readable medium of claim 1, wherein the at least one recommended media item comprises a plurality of recommended media items, and there is a plurality of corresponding media item recommendations that includes the media item recommendation, and wherein the plurality of selectors further comprises:
  a maximum media items selector for establishing a maximum number of the plurality of corresponding media item recommendations in a recommendations queue; and
  a plurality of remove media items selectors for selecting a basis for removal of one or more of the plurality of corresponding media item recommendations from the recommendations queue.

9. The non-transitory computer readable medium of claim 8, wherein the basis for removal of the one or more of the plurality of corresponding media item recommendations from the recommendations queue is a basis comprised from a group consisting of: score, timestamp, and current sort.

10. The non-transitory computer readable medium of claim 1, wherein the plurality of selectors further comprises a maximum download sessions selector for specifying a maximum number of open sockets for downloading a maximum number of download sessions.

11. The non-transitory computer readable medium of claim 1, wherein the plurality of selectors further comprises:
  a maximum download attempts selector for establishing a maximum number of attempts to download the media item; and
  a retry interval selector for establishing a time interval between the attempts to download the media item.

12. The non-transitory computer readable medium of claim 1, wherein the plurality of selectors further comprises a flush on rescoring selector, wherein upon selecting the flush on rescoring selector a download queue is emptied of the media items in the download queue upon the media item playlist being re-sorted.

13. The non-transitory computer readable medium of claim 1, wherein the plurality of selectors further comprises an omit media items selector, wherein upon selecting the omit media items selector, the media item in a download queue is omitted from the download queue.

* * * * *